United States Patent
Hormis et al.

(10) Patent No.: US 11,811,146 B2
(45) Date of Patent: Nov. 7, 2023

(54) CONFIGURABLE BEAMFORMING REPEATER

(71) Applicant: QUALCOMM Incorporated, San Diego, CA (US)

(72) Inventors: Raju Hormis, New York, NY (US); Junyi Li, Chester, NJ (US); Navid Abedini, Somerset, NJ (US); Juergen Cezanne, Ocean Township, NJ (US); Ozge Koymen, Princeton, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 236 days.

(21) Appl. No.: 16/789,349

(22) Filed: Feb. 12, 2020

(65) Prior Publication Data

US 2020/0280127 A1 Sep. 3, 2020

Related U.S. Application Data

(60) Provisional application No. 62/811,995, filed on Feb. 28, 2019.

(51) Int. Cl.
*H01Q 3/26* (2006.01)
*H04B 7/06* (2006.01)
(Continued)

(52) U.S. Cl.
CPC ......... *H01Q 3/2605* (2013.01); *H01Q 25/001* (2013.01); *H04B 1/04* (2013.01); *H04B 7/0617* (2013.01); *H04B 2001/0416* (2013.01)

(58) Field of Classification Search
CPC .. H01Q 15/0086; H01Q 21/24; H01Q 25/001; H01Q 3/2605; H04B 1/04;
(Continued)

(56) References Cited

U.S. PATENT DOCUMENTS 5,373,297 A 12/1994 Briguglio
6,934,511 B1 * 8/2005 Lovinggood .......... H01Q 21/29
455/24
(Continued)

FOREIGN PATENT DOCUMENTS

CN 1823470 A 8/2006
WO WO-2004002014 A1 12/2003

OTHER PUBLICATIONS

International Search Report and Written Opinion—PCT/US2020/018084—ISAEPO—dated May 8, 2020.
(Continued)

*Primary Examiner* — David S Huang
(74) *Attorney, Agent, or Firm* — QUALCOMM Incorporated

(57) ABSTRACT

Methods, systems, and devices for wireless communication are described. A wireless repeater beamforms a receive signal, at a first antenna array. The repeater retransmits, via a second antenna array, a beamformed signal. The repeater may adjust the receive and/or transmit beam in order to avoid signal interference caused by the retransmission. The repeater may monitor an output of a power amplifier (PA) in a signal processing chain and adjust a gain to a PA driver to the PA and/or a gain to one or more low noise amplifiers (LNAs) in the signal processing chain in order to improve or maintain transmission stability in the repeater.

28 Claims, 20 Drawing Sheets

(51) Int. Cl.
*H01Q 25/00* (2006.01)
*H04B 1/04* (2006.01)

(58) Field of Classification Search
CPC .......... H04B 2001/0416; H04B 7/0617; H04B 7/086; H04B 7/10; H04B 7/155; H04B 7/15535

See application file for complete search history.

(56) References Cited

U.S. PATENT DOCUMENTS

| | | |
|---|---|---|
| 8,244,175 B2 | 8/2012 | Rofougaran |
| 8,489,019 B2 | 7/2013 | Rofougaran |
| 8,498,234 B2 | 7/2013 | Proctor et al. |
| 8,638,835 B2 | 1/2014 | Wang et al. |
| 9,014,622 B2 | 4/2015 | Rofougaran |
| 9,553,754 B1 * | 1/2017 | Dorosenco .......... H04L 27/3863 |
| 9,692,489 B1 | 6/2017 | Rofougaran et al. |
| 10,110,330 B1 | 10/2018 | Zhou et al. |
| 10,608,678 B1 | 3/2020 | Hormis et al. |
| 2005/0032487 A1 * | 2/2005 | Montalvo ............ H03G 3/3047 455/127.1 |
| 2010/0079354 A1 | 4/2010 | Lam et al. |
| 2015/0124693 A1 | 5/2015 | Ahn |
| 2018/0351605 A1 * | 12/2018 | Liang .................. H04B 7/0617 |
| 2018/0352444 A1 | 12/2018 | Sridharan et al. |
| 2019/0020401 A1 | 1/2019 | Gharavi et al. |
| 2020/0195310 A1 | 6/2020 | Abedini et al. |
| 2020/0280355 A1 | 9/2020 | Abedini et al. |
| 2020/0280365 A1 | 9/2020 | Abedini et al. |
| 2020/0280887 A1 | 9/2020 | Abedini et al. |
| 2020/0295914 A1 | 9/2020 | Hormis et al. |
| 2020/0314601 A1 | 10/2020 | Hormis et al. |
| 2020/0322037 A1 | 10/2020 | Abedini et al. |
| 2020/0382208 A1 | 12/2020 | Hormis et al. |
| 2021/0036764 A1 | 2/2021 | Li et al. |
| 2021/0037457 A1 | 2/2021 | Li et al. |
| 2021/0037459 A1 | 2/2021 | Li et al. |
| 2021/0037460 A1 | 2/2021 | Li et al. |
| 2021/0037574 A1 | 2/2021 | Li et al. |
| 2021/0044412 A1 | 2/2021 | Li et al. |

OTHER PUBLICATIONS

Abari O., et al., "Enabling High-Quality Untethered Virtual Reality", USENIX Association, Proceedings of the 14th USENIX Symposium on Networked Systems Design and Implementation (NSDI '17), Mar. 27-29, 2017, 15 Pages.

Zaman A.U., et al., "Dual Beam Phased Array Antenna with Wide Scan Angle For Repeater Applications", 5th International Conference on Electrical and Computer Engineering ICECE 2008, Dec. 20-22, 2008, Dhaka, Bangladesh, pp. 755-759.

* cited by examiner

CONFIGURABLE BEAMFORMING REPEATER

CROSS REFERENCE

The present Application for Patent claims the benefit of U.S. Provisional Patent Application No. 62/811,995 by HORMIS et al., entitled "CONFIGURABLE BEAMFORMING REPEATER," filed Feb. 28, 2019, assigned to the assignee hereof, and expressly incorporated herein.

BACKGROUND

The following relates generally to wireless communication, and more specifically to a configurable beamforming repeater.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Wireless communications systems may implement wireless repeaters for repeating and extending signals received from base stations to UEs and signals received from UEs to base stations. Some wireless signals may be limited by path-loss through the air, physical blockers, or other constraints. In some cases, wireless repeaters suffer from radiation leakage, in which transmission signals from the repeater "leak" back to the reception path causing instability in the repeater and affecting signal quality.

SUMMARY

The described techniques relate to improved methods, systems, devices, and apparatuses that support configurable beamforming repeater. Generally, the described techniques provide a repeater for beamforming a received signal via one or more scan angles/beamforming directions and then retransmitting and beamforming the retransmitted signal via one or more scan angles/beamforming directions. The repeater is configured to adjust the receiver beamformer or transmit beamformer in order to reduce signal interference caused by the retransmitting. The repeater further includes a signal processing chain connected to route the signal between reception at the first antenna array and retransmission at the second antenna array. The signal processing chain may include at least one power amplifier (PA). A feedback path of the repeater may adjust a gain of an amplifier based on an output of the at least one PA.

A method for wireless communication is described. The method may include receiving, at a first antenna array of a wireless repeater, a signal via directional beamforming, retransmitting the signal via directional beamforming at a second antenna array of the wireless repeater, and adjusting, via a beam controller, at least one of the directional beamforming for receiving the signal or transmitting the signal in order to reduce signal interference caused by the retransmitting.

An apparatus for wireless communication is described. The apparatus may include means for receiving, at a first antenna array of a wireless repeater, a signal via directional beamforming, means for retransmitting the signal via directional beamforming at a second antenna array of the wireless repeater, and means for adjusting, via a beam controller, at least one of the directional beamforming for receiving the signal or transmitting the signal in order to reduce signal interference caused by the retransmitting.

Some examples of the method and apparatus described herein may further include operations, features, or means for monitoring an output of at least one power amplifier (PA) of a signal processing chain connected to route the signal between reception at the first antenna array and retransmission at the second antenna array, and adjusting, based on the output, a gain of a PA driver to the PA.

Some examples of the method and apparatus described herein may further include operations, features, or means for adjusting, based on the output, a gain of at least one low noise amplifier (LNA) connected to the first antenna array.

In some examples of the method and apparatus described herein, monitoring the output of at least one PA of the signal processing chain may include operations, features, or means for monitoring the output of the at least one PA via a feedback path connected to the signal processing chain between the first antenna array and the second antenna array.

In some examples of the method and apparatus described herein, the feedback path includes a coupler for connecting to the signal processing chain, a power detector for monitoring the output of the PA, and a gain controller for adjusting the gain of the PA driver to the PA.

Some examples of the method and apparatus described herein may further include operations, features, or means for using the gain controller to adjust the gain of the PA driver to the PA and to adjust a gain of one or more low noise amplifiers (LNAs) coupled to respective antennas of the first antenna array.

In some examples of the method and apparatus described herein, the first antenna array includes an dual pole antenna array functioning in a first polarization and the second antenna array includes the dual pole antenna array functioning in a second polarization.

Some examples of the method and apparatus described herein may further include operations, features, or means for pre-processing the signal via respective low noise amplifiers (LNAs) and phase shifters that correspond to each antenna of the first antenna array, the pre-processing resulting in a set of pre-processed instances of the signal, combining, via a combiner circuit of the wireless repeater, the set of pre-processed instances of the signal into a combined signal, dividing, via a divider circuit of the wireless repeater, the combined signal to a set of transmit paths corresponding to a set of antennas of the second antenna array, each transmit path including at least a power amplifier driver and a power amplifier (PA), monitoring respective outputs of the PAs of each transmit path, and adjusting, based on the respective outputs, a gain of respective PA drivers in the transmit paths.

Some examples of the method and apparatus described herein may further include operations, features, or means for pre-processing the signal via respective phase shifters that correspond to each antenna of the first antenna array, the pre-processing resulting in a set of pre-processed instances of the signal, combining, via a combiner circuit of the wireless repeater, the set of pre-processed instances of the signal into a combined signal to a transmission path, the transmission path including at least a low noise amplifier (LNA), a power amplifier driver, and a power amplifier (PA), and dividing, via a divider circuit of the wireless repeater, the combined signal to a set of transmit paths corresponding to a set of antennas of the second antenna array.

Some examples of the method and apparatus described herein may further include operations, features, or means for monitoring, an output of the PA of the transmission path, and adjusting, based on the output, a gain of the power amplifier driver to the PA.

Some examples of the method and apparatus described herein may further include operations, features, or means for pre-processing the signal via respective phase shifters that correspond to each antenna of the first antenna array, the pre-processing resulting in a set of pre-processed instances of the signal routed to a set of transmit paths corresponding to a set of antennas of the second antenna array, each transmit path including at least a power amplifier driver and a power amplifier (PA), monitoring respective outputs of the PAs of each transmit path, and adjusting, based on the respective outputs, a gain of respective PA drivers in the transmit paths.

Some examples of the method and apparatus described herein may further include operations, features, or means for pre-processing the signal via respective phase shifters that correspond to each of a set dual pole antennas functioning in a first polarization to include the first antenna array, the pre-processing resulting in a set of pre-processed instances of the signal, combining, via a combiner circuit of the wireless repeater, the set of pre-processed instances of the signal into a combined signal to a transmission path, the transmission path including at least a low noise amplifier (LNA), a power amplifier driver, and a power amplifier (PA), dividing, via a divider circuit of the wireless repeater, the combined signal to a set of transmit paths corresponding to the set of dual pole antennas functioning in a second polarization to include the second antenna array, monitoring, an output of the PA of the transmission path, and adjusting, based on the output, a gain of the PA driver.

Some examples of the method and apparatus described herein may further include operations, features, or means for pre-processing the signal via respective phase shifters and low noise amplifiers (LNAs) that correspond to each dual pole antenna functioning in a first polarization to include the first antenna array, the pre-processing resulting in a set of pre-processed instances of the signal routed to a set of transmit paths corresponding to each of the dual pole antennas functioning in a second polarization to include the second antenna array, each transmit path including at least a power amplifier driver and a power amplifier (PA), where the first antenna array and the second antenna array include a same set of dual pole antennas, monitoring respective outputs of the PAs of each transmit path, and adjusting, based on the respective outputs, a gain of respective PA drivers in the transmit paths.

Another apparatus for wireless communication is described. The apparatus may include a first antenna array configured to receive a signal via directional beamforming, a second antenna array configured to retransmit the signal via directional beamforming transmit beams, a signal processing chain connected to route the signal between reception at the first antenna array and retransmission at the second antenna array, the signal processing chain comprising at least one power amplifier (PA), and a feedback path for adjusting a gain of a PA driver for the at least one PA based on an output of the at least one PA.

Some examples of the method and apparatus described herein may further include a coupler for connecting the feedback path to the signal processing chain, a power detector for monitoring the output of the PA, and a gain controller for adjusting the gain of the PA driver to the PA.

Some examples of the method and apparatus described herein may further include a low noise amplifier (LNA) for each antenna of the first antenna array, the feedback path further for adjusting a gain of the LNA based on the output of the at least one PA.

Some examples of the method and apparatus described herein may further include a low noise amplifier (LNA) for each antenna of the first antenna array, the feedback path further for adjusting a gain of the LNA based on the output of the at least one PA.

Some examples of the method and apparatus described herein may further include a plurality of receive paths that are each connected to a respective antenna of the first antenna array, each of the plurality of receive paths include a respective low noise amplifier (LNA) and a phase shifter, a combiner circuit configured to combine signals received through the plurality of receive paths, and a divider circuit configured to divide an output of the combiner circuit into a plurality of transmit paths, wherein each of the plurality of transmit paths includes a respective PA driver and a PA.

In some examples of the method and apparatus described herein, the feedback path may further include a plurality of feedback paths corresponding to each of the plurality of transmit paths.

Some examples of the method and apparatus described herein may further include a gain controller coupled to each of the plurality of feedback paths for adjusting the gains of respective PA drivers.

Some examples of the method and apparatus described herein may further include a plurality of receive paths that are each connected to a respective antenna of the first antenna array, each of the plurality of receive paths include a respective phase shifter, a combiner circuit configured to combine signals received through the plurality of receive paths to a transmission path including the at least one PA, and a divider circuit configured to divide an output of the transmission path into a plurality of transmit paths corresponding to a plurality of antennas of the second antenna array.

Some examples of the method and apparatus described herein may further include a gain controller coupled to the feedback path for adjusting the gain of the PA driver.

In some examples of the method and apparatus described herein, the signal processing chain may further include a plurality of transmit paths that are each connected to a respective antenna of the first antenna array and a respective antenna of the second antenna array, wherein each of the plurality of transmit paths includes a respective low noise amplifier (LNA), a phase shifter, a power amplifier driver, and a PA.

Some examples of the method and apparatus described herein may further include a plurality of feedback paths corresponding to each of the plurality of transmit paths.

Some examples of the method and apparatus described herein may further include a gain controller coupled to each of the plurality of feedback paths for adjusting the gains of respective PA drivers.

Some examples of the method and apparatus described herein may further include a gain controller coupled to each of the plurality of feedback paths for adjusting the gains of respective PA drivers.

Some examples of the method and apparatus described herein may further include a plurality of receive paths that are each connected to a respective dual pole antenna functioning in a first polarization to comprise the first antenna array, wherein each of the plurality of receive paths includes a respective phase shifter, a combiner circuit configured to combine signals received through the plurality of receive paths to a transmission path, wherein the transmission path includes a low noise amplifier (LNA), the PA driver, and the PA, and a divider circuit configured to divide an output of the transmission path into a plurality of transmit paths corresponding to the plurality of dual pole antennas functioning in a second polarization to comprise the second antenna array, wherein the first antenna array and the second antenna array include a same set of dual pole antennas.

Some examples of the method and apparatus described herein may further include a gain controller coupled to the feedback path for adjusting the gain of the PA driver.

In some examples of the method and apparatus described herein, the signal processing chain may further include a plurality of transmit paths corresponding to each of the plurality of dual pole antennas of a dual pole antenna array, the dual pole antenna array functioning in a first polarization to comprise the first antenna array and the dual pole antenna array functioning in a second polarization to comprise the second antenna array, each of the plurality of transmit paths including a respective low noise amplifier (LNA), a phase shifter, a PA driver, and a PA, wherein the first antenna array and the second antenna array comprise a same set of dual pole antennas.

Some examples of the method and apparatus described herein may further include a plurality of feedback paths corresponding to each of the plurality of transmit paths.

Some examples of the method and apparatus described herein may further include a gain controller coupled to each of the plurality of feedback paths for adjusting the gains of respective PA drivers.

Some examples of the method and apparatus described herein may further include a digital echo cancellation circuit for improving isolation between the first antenna array and the second antenna array.

Some examples of the method and apparatus described herein may further include a reception beam control circuit for adjusting a phase shifter for each antenna of the first antenna array, and a transmission beam control circuit for adjusting a phase shifter for each antenna of the second antenna array.

Some examples of the method and apparatus described herein may include the first antenna array, the second antenna array, or both being a meta-material antenna having a negative refractive index.

DETAILED DESCRIPTION

A wireless repeater may repeat, extend, and/or redirect wireless signals received from a base station to a UE and/or from the UE to a base station. The repeater may receive a signal from a base station and retransmit the signal to a UE and/or receive a signal from a UE and retransmit the signal to the base station. The wireless repeater supports beamforming, which may assist in preventing transmission radiation from leaking into or interfering with the reception path of the repeater. Beamforming is utilized in the repeater to improve reception and transmission isolation, which may reduce signal leakage. A beamforming control circuit may improve isolation by controlling beam direction and width, which may result in a reduction in signal interference caused by retransmitting.

The repeater may be a phased array repeater with an array of reception antennas, an array of transmission antennas, and a signal processing chain, which is used to process the received signals and retransmit the signals. In some cases, the array of reception antennas and the array of transmission antennas are the same set of dual pole antennas, which may function in a first polarization as the reception antenna array and a second polarization as the transmission antenna array. The signal processing chain may be implemented as a radiofrequency integrated circuit (RFIC) (e.g., monolithic microwave integrated circuits (MMICs) and may include a series of phase shifters for controlling the beam width and direction in the reception antenna array and/or the transmission antenna array. The series of phase shifters may be controlled by one or more beam controllers (e.g., beamformers). The signal processing chain may further include a feedback path for real-time or near real-time gain control to increase stability within the signal processing chain. The feedback path may be coupled to one or more transmit paths within the signal processing chain. The feedback path detects an output of a power amplifier (PA) and adjusts a gain to a driver to the PA to improve or maintain signal stability within the RFIC. In some cases, the gain to one or more low noise amplifiers (LNAs) of the signal processing chain may be adjusted based on the output of the PA.

Aspects of the disclosure are initially described in the context of a wireless communications system. Aspects of the disclosure are further described in the context of block diagrams of a wireless repeater, circuit diagrams of integrated circuits within the wireless repeater, and a process flow diagram. Aspects of the disclosure are further illustrated by and described with reference to apparatus diagrams, system diagrams, and flowcharts that relate to a configurable beamforming repeater.

Figure 1:
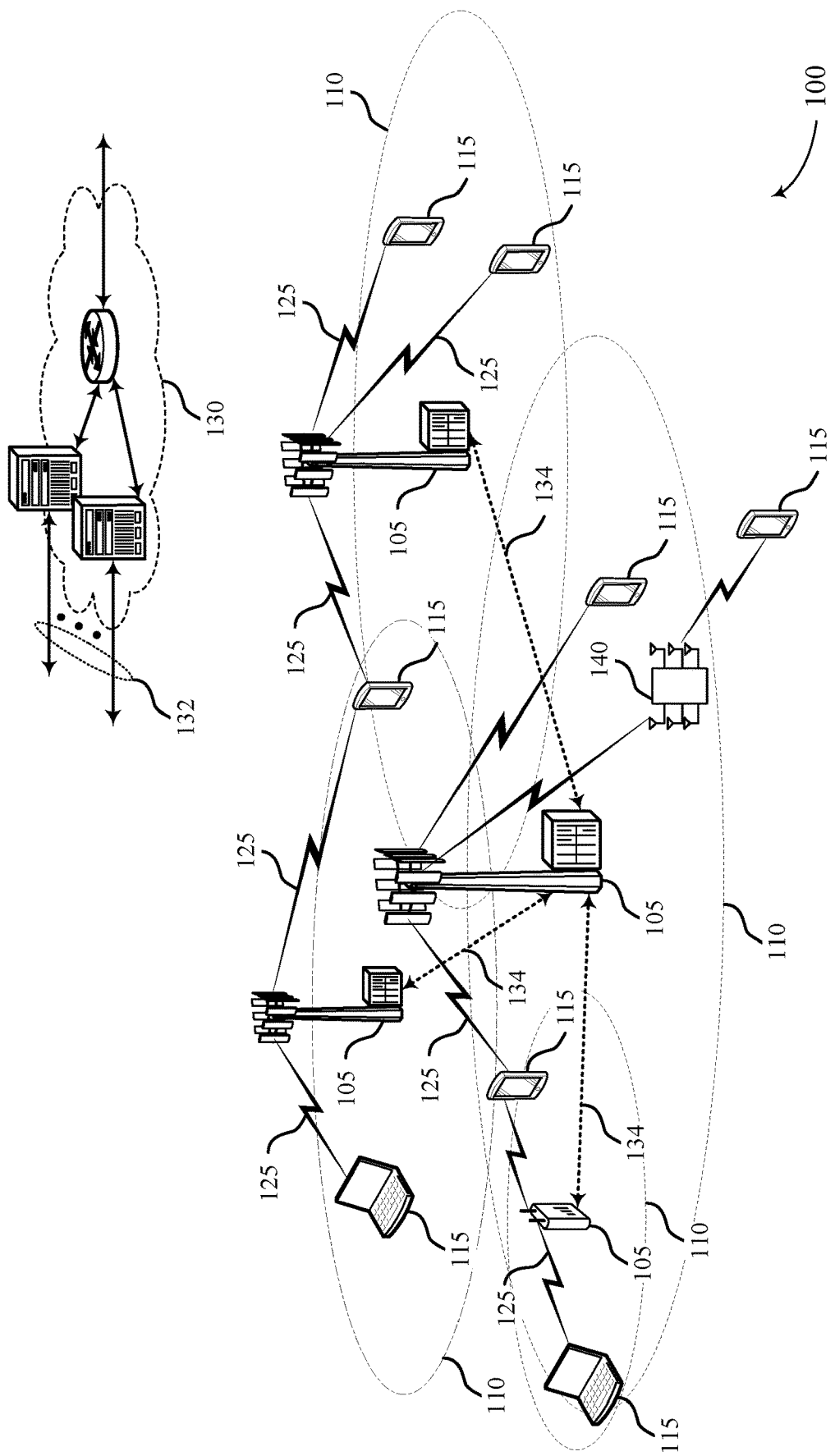
FIG. 1 illustrates an example of a system for wireless communication that supports a configurable beamforming repeater in accordance with aspects of the present disclosure.

FIG. 1 illustrates an example of a wireless communications system 100 that supports a configurable beamforming repeater in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or New Radio (NR) network, or a fifth generation (5G) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30{,}720{,}000$ seconds. Time intervals of a communications resource may be organized according to radio frames each having a duration of 10 milliseconds (ms), where the frame period may be expressed as $T_f=307{,}200\, T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a wireless local area network (WLAN), such as a Wi-Fi (i.e., Institute of Electrical and Electronics Engineers (IEEE) 802.11) network may include an access point (AP) that may communicate with one or more wireless or mobile devices. The AP may be coupled to a network, such as the Internet, and may enable a mobile device to communicate via the network (or communicate with other devices coupled to the access point). A wireless device may communicate with a network device bi-directionally. For example, in a WLAN, a device may communicate with an associated AP via downlink (e.g., the communication link from the AP to the device) and uplink (e.g., the communication link from the device to the AP). A wireless personal area network (PAN), which may include a Bluetooth connection, may provide for short range wireless connections between two or more paired wireless devices. For example, wireless devices such as cellular phones may utilize wireless PAN communications to exchange information such as audio signals with wireless headsets.

A device may be capable of both Bluetooth and WLAN communications. These communications may be associated with different communication protocols and, in some cases, may share a communication medium. As such, coexistence solutions to enable Bluetooth and WLAN communications by devices equipped with both Bluetooth and WLAN operation may be desired.

In some cases, Bluetooth communications may require enhanced quality of service. For example, successful bidirectional transmission of audio information for voice may have a relatively low tolerance for packet loss or timing issues. The link quality between two devices may affect the data rate used for communications (e.g., as poor link quality may be associated with reduced bitrates for more robust communications).

Wireless communications system 100 may include one or more wireless repeaters 140. The wireless repeaters 140 may include functionality of base station 105 and/or UE 115 for repeating, extending, and/or redirecting wireless signals. In some cases, a wireless repeater 140 may be used in line of site (LOS) or non-line of sight (NLOS) scenarios. In a LOS scenario, transmissions, such as mmW transmissions, may be limited by path-loss through air, which may be overcome using beamforming techniques at the wireless repeater 140. In a NLOS scenario, such as in an urban area or indoors, mmW transmissions may be limited by signal blocking or signal interfering physical objects. A mmW beamforming repeater 140 may be utilized to receive a signal from a base station 105 and transmit the signal to the UE 115 and/or receive a signal from a UE 115 and transmit the signal to the base station 105. Beamforming and gain control techniques may be utilized to improve signal quality among the base station 105, repeater 140, and UE 115 by isolating signals (e.g., via beamforming) and improving or maintaining stability within a signal processing chain of the repeater (e.g., via gain control).

The mmW wireless repeater 140 includes an array of reception antennas and an array of transmission antennas. In some cases, the array of reception antennas and the array of transmission antennas comprise the same set of dual-pole antennas, wherein the dual pole antennas function in a first polarization as the array of reception antennas and the dual pole antennas function in a second polarization as the array of transmission antennas. In some cases, the antennas comprise meta-material antennas or antenna arrays. The repeater 140 may further include a beam control system, which may comprise a system on chip (SoC) for controlling transmit and/or receive beams to reduce signal interference caused by retransmission.

In some cases, the mmW wireless repeater 140 is an analog radiofrequency (RF) repeater, and the mmW wireless repeater 140 may include a signal processing chain connected (e.g., coupled, linked, attached) between the array of reception of antennas and the array of transmission antennas. The signal processing chain may be implemented as a RFIC, which may include RF/microwave components such as one or more phase shifters, LNAs, PAs, PA drivers, gain controllers, power detectors, or other circuitry. The phase shifters may be controlled by one or more beam controllers for beamforming to reduce signal interference. The signal processing chain may include a feedback path for monitoring the output of one or more PAs, and adjusting gains to one or more PA drivers to the PAs and gains to one or more LNAs based on the output. The gain adjustment may function to stabilize the signal reception and transmission and improve signal quality between devices such as base station 105 and UE 115. Accordingly, through beamforming and gain control, signal quality (e.g., mmW signals) may be improved in LOS and NLOS scenarios.

As described, the mmW wireless repeater 140 may include components (e.g., antenna arrays and signal processing chain circuitry) in the analog/RF domain. Accordingly, the mmW wireless repeater may not include any digital components for various features described herein. In some cases, the mmW wireless repeater may include side channel components for receiving beamforming configurations from a base station 105 or other device. Example side channels may be implemented as Bluetooth, ultra-wide band, wireless LAN, etc. protocols, and as such, the repeater may include circuitry and/or processors for receiving and/or processing signals received via those protocols and controlling beamforming at the RF/microwave components based on those signals received via the side channel.

Figure 2:
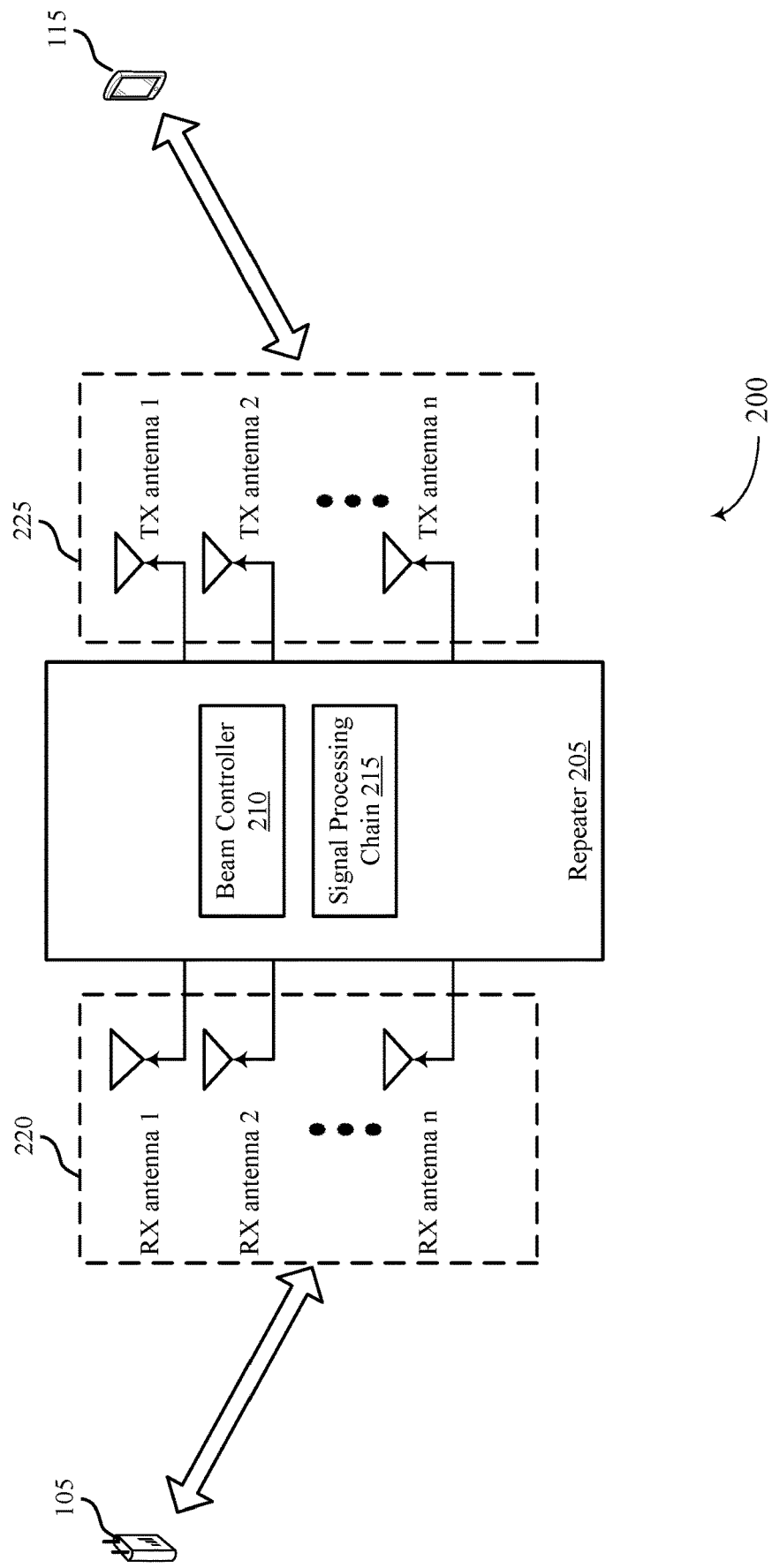
FIG. 2 illustrates an example of a block diagram of a configurable beamforming repeater in accordance with aspects of the present disclosure.

FIG. 2 illustrates an example of a block diagram 200 of a configurable beamforming repeater 205 in accordance with aspects of the present disclosure. In some examples, the devices of FIG. 2 may implement aspects of wireless communications system 100, and the repeater 205 may be an example of the repeater 140 of FIG. 1. The block diagram 200 includes a base station 105 and a UE 115. The repeater 205 includes a reception antenna array 220 including a set of antennas and a transmission antenna array 225 including a set of antennas. In some cases, the reception antenna array 220 and the transmission antenna array 225 are the same antenna arrays including the same set of dual pole antennas functioning in first and second polarizations as the reception and the transmission antenna array. In some cases, the reception antenna array 220 and/or the transmission antenna array 225 comprise meta-material antennas.

The repeater 205 may further include a beam controller 210 and a signal processing chain 215, which may include various circuitry including one or more PAs, LNAs, phase shifters, dividers, and/or combiners. The signal processing chain may include various analog/RF domain components and may be implemented as a RFIC (e.g., MMIC). Beam controller 210 (e.g., a beamformer) may control beam direction and width of the reception antenna array 220 and/or the transmission antenna array 225 using the phase shifters of the signal processing chain 215 to improve or maintain isolation between various reception and transmission beams. In some cases, the beam controller 210, using the phase shifters, controls beam direction to ensure target reception and/or transmission beams are sufficiently spread apart to avoid interference. Furthermore, the beam controller 210 may utilize antenna adjustments to adjust beam width, such as certain amplitude and phase offsets to signals carried via the antenna elements of the reception antenna array 220 and the transmission antenna array 225. In some cases, the adjustments associated with the antenna elements may be defined by a beamforming weight set associated to the antenna arrays 220 and 225.

In some cases, the beam configurations (e.g., width and direction) as well as gain adjustments may be controlled by the base station 105 via a side control channel. For example, the beam controller 210 may be controlled by a base station 105 via a side channel implemented as a Bluetooth channel, ultra-wide band channel, wireless local area network (LAN) channel, or the like. Accordingly, the repeater 205 may include circuitry for receiving and/or processing side channel communications to control the beam controller 210. The base station 105 may transmit beamforming control configurations based on operating environment, position of the UE 115, and/or configuration of the UE 115.

The repeater 205 may receive signals from the base station 105 according to a beamforming configuration and retransmit the signals to the UE 115 according to a beamforming configuration. The repeater 205 may further receive signals from the UE 115 according to a beamforming configuration and retransmit the signals to the UE 115 according to a beamforming configuration. As such, the repeater 205 may function to implement uplink and downlink communications, and the beam controller 210 and signal processing chain 215 be utilized for communication in uplink or downlink scenarios.

Figure 3:
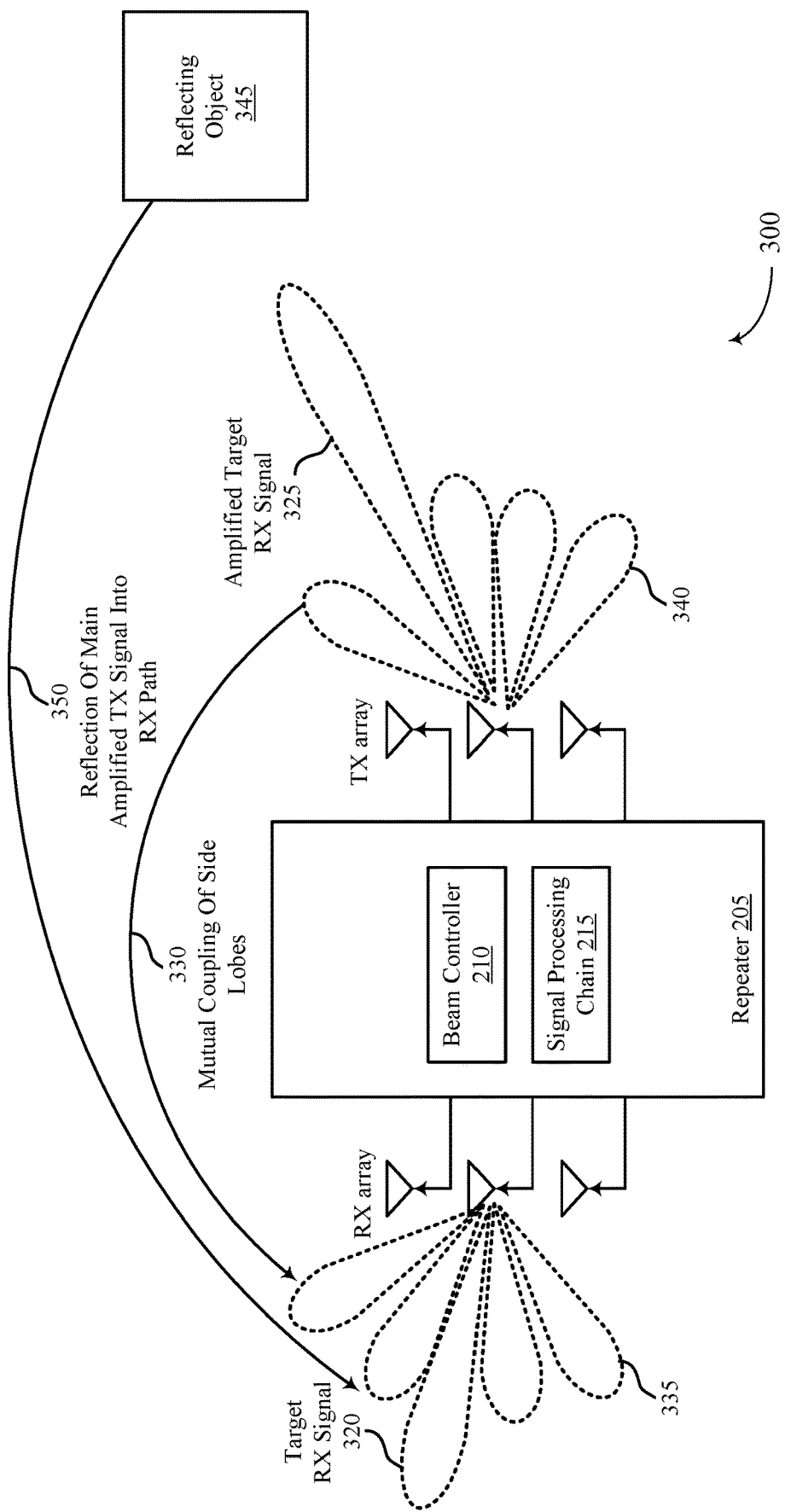
FIG. 3 illustrates an example of another block diagram of a configurable beamforming repeater in accordance with aspects of the present disclosure.

FIG. 3 illustrates an example of another block diagram 300 of a configurable beamforming repeater 205 in accordance with aspects of the present disclosure. In some examples, components of the repeater 205 may implement aspects of wireless communications system 100. The repeater 205 may include a reception antenna array and transmission antenna array as described with respect to FIG. 2. The repeater 205 may beamform the received signal via various beam directions (or scan angles). Lobes (e.g., lobes 320 and 335) illustrate the effective spatial shape of the received signal power after beamforming within the repeater. The lobe 320 (e.g., main lobe) is typically directed to a target reception signal, which may be transmitted by a UE 115 or a base station 105. The target reception signal may correspond to the signal to be retransmitted to another device such as a UE 115 or base station 105. Lobes (e.g., lobes 325 and 340) illustrate the effective spatial shape of a transmitted signal power after beamforming within the repeater. The beam controller 210 may adjust the beam configuration such that the reception antenna array receives a higher quality target signal. The beam controller 210 may further adjust the beam configuration of the transmission antenna array such that the target device receives a higher quality signal. In some cases, a transmit or receive beam is amplified for better reception or retransmission of the target signal.

Arrow 330 illustrates possible signal reception and retransmission interference via mutual coupling (e.g., signal leakage) of side lobes of the respective beam configurations of the reception antenna array and the transmission antenna array. The beam controller 210 may adjust beam width and/or direction to avoid the mutual coupling. Furthermore, the signal processing chain 215 may implement gain control techniques to improve stability and reduce interference in the repeater 205. Arrow 350 illustrates reflection of an amplified signal (e.g., lobe 325) from a reflecting object 345 and to the signal reception beam configuration, which may cause signal interference or leakage. The beam controller 210 may adjust beam width and/or direction to avoid interference via reflection. As illustrated in FIGS. 4 through 9, the signal processing chain may include various communication circuitry in various layouts. It should be understood that circuitry of the signal processing chain may be configured in layouts not specifically illustrated in FIGS. 4 through 9. In some cases, the signal processing chain 215 is implemented as a RFIC. In some cases, the aspects of this disclosure may be implemented using digital systems and components. In some cases, the meta-material antennas described in FIG. 9 may be used in the circuitry illustrated with respect to FIGS. 4-8. When the meta-material antennas are utilized, the circuitry may not include phase shifters and/or feedback paths.

Figure 4:
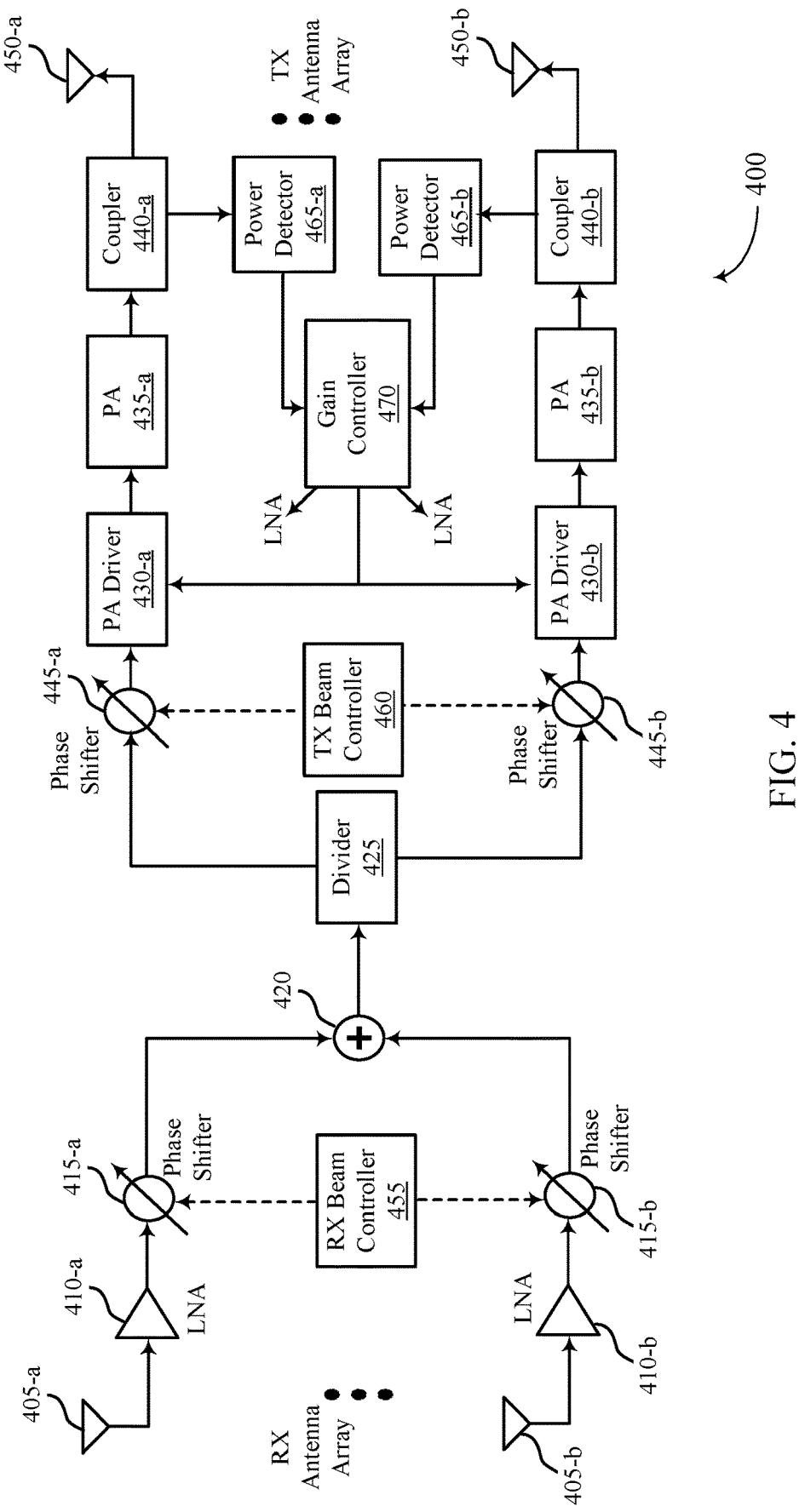
FIGS. 4 through 9 illustrate example circuit diagrams of a signal processing chain that supports a configurable beamforming repeater in accordance with aspects of the present disclosure.

FIG. 4 illustrates an example of a circuit diagram 400 of a signal processing chain that supports a configurable beamforming repeater in accordance with aspects of the present disclosure. In some examples, signal processing chain may implement aspects of wireless communications system 100. The various components, including transmission lines, LNAs 410, phase shifters 415 and 445, combiner circuit 420, divider circuit 425, PA driver 430, PA 435, coupler 440, reception beam controller 455, transmission (TX) beam controller 460, gain controller 470, and power detectors 465 between the reception (RX) antenna array including antennas 405 and the TX antenna array including antennas 450 may be considered the signal processing chain and may be implemented as a RFIC. Accordingly, the signal processing chain may include connection points between the antennas 405 and 450 and the components of the signal processing chain.

A plurality of receive paths for respective RX antennas 405 include LNAs 410 and phase shifters 415, which may function to pre-process signals received at the RX antenna array comprising the antennas 405, and the pre-processing may result in a plurality of pre-processed instances of the signal routed to the combiner circuit 420. For example, based on RX beam controller 455 signals applied to the phase shifter 415-*a*, the antenna 405-*a* may receive a signal, which is routed to the LNA 410-*a*, phase shifter 415-*a* and to the combiner circuit 420 as a pre-processed instance of the signal. Similarly, based on RX beam controller 455 signals applied to the phase shifter 415-*b*, the antenna 405-*b* may receive a signal, which is routed to the LNA 410-*b*, phase shifter 415-*b* and to the combiner circuit 420 as a pre-processed instance of the signal.

The combiner circuit 420, which may be an example of a Wilkinson power combiner or other RF signal combining circuit, combines the pre-processed instances of the signal into a combined signal. Divider circuit 425, which may be an example of a Wilkinson power divider or other RF signal dividing circuit, divides the output of the combiner circuit 420 (e.g., a combined signal) to a plurality of transmit paths corresponding to the plurality of antennas 450 of the second antenna array. Each transmit path may include a PA driver 430, PA 435-a, and a coupler 440-a. Power detectors 465 are coupled to each of the transmit paths via couplers 440 and monitor the output of the PAs 435 of each transmit path. For example, divider circuit 425 divides the combined signal to the transmit path including phase shifter 445-a, PA driver 430-a, and coupler 440-a and corresponding to antenna 450-a. Furthermore, the divider circuit 425 divides the combined signal to the transmit path including phase shifter 445-b, PA driver 430-b, and coupler 440-b and corresponding to antenna 450-b. That is, the divider circuit 425 may divide the combined signal into a number of transmit paths corresponding to the number of antennas 450 in the TX antenna array. Power detector 465-a monitors the output of PA 435-a-a via coupler 440-a, and power detector 465-b monitors the output of PA 435-b via coupler 440-b. Based on the monitored output, the gain controller 470 may adjust a gain of one or more of the PA drivers 430 and/or the gain of the LNAs 410. Accordingly, using the PA output, the gain controller 470 may increase or maintain stability of signal transmission within the signal processing chain. The couplers 440-a and power detectors 465 may comprise respective feedback paths, which are coupled to the gain controller 470.

Figure 5:
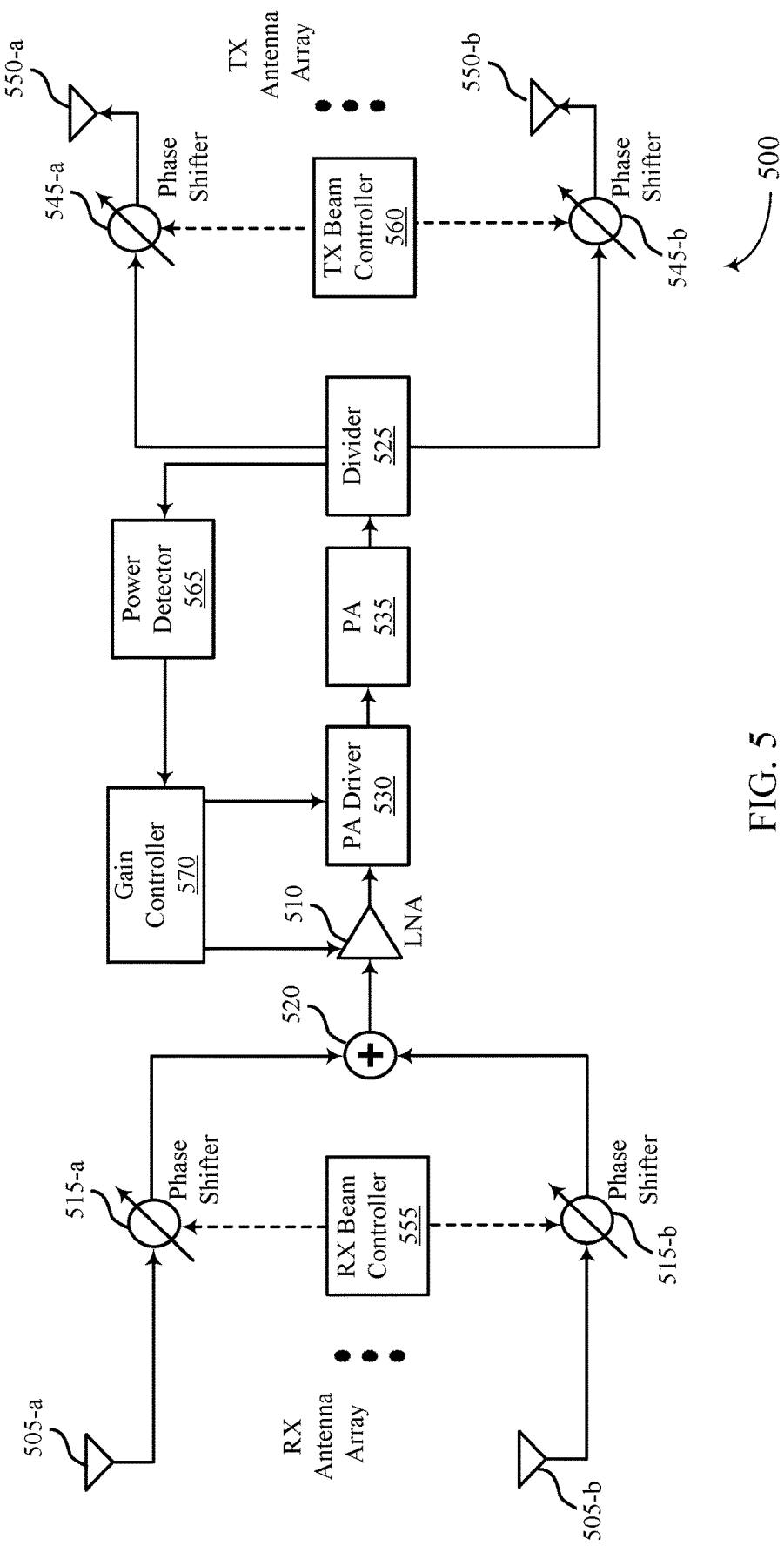

FIG. 5 illustrates an example of a circuit diagram 500 of a signal processing chain that supports a configurable beamforming repeater in accordance with aspects of the present disclosure. In some examples, signal processing chain may implement aspects of wireless communications system 100. The various components, including transmission lines, LNA 510, phase shifters 515 and 545, combiner circuit 520, divider circuit 525, PA driver 530, PA 535, reception beam controller 555, transmission (TX) beam controller 560, gain controller 570, and power detector 565 between RX antenna array including antennas 505 and TX antenna array including antennas 550 may be considered the signal processing chain and may be implemented as a RFIC. Accordingly, the signal processing chain may include connection points between the antennas 505 and 550 and the components of the signal processing chain.

A plurality of receive paths for respective RX antennas 505 include phase shifters 515, which may function to pre-process signals received at the RX antenna array comprising the antennas 505, and the pre-processing may result in a plurality of pre-processed instances of the signal routed to the combiner circuit 520. For example, based on RX beam controller 555 signals applied to the phase shifter 515-a, the antenna 505-a may receive a signal, which is routed to the phase shifter 515-a of a receive path and to the combiner circuit 520 as a pre-processed instance of the signal. Similarly, based on RX beam controller 555 signals applied to the phase shifter 515-b, the antenna 505-b may receive a signal, which is routed to the phase shifter 515-b of a receive path and to the combiner circuit 520 as a pre-processed instance of the signal.

The combiner circuit 520, which may be an example of a Wilkinson power combiner or other RF signal combining circuit, combines the pre-processed instances of the signal received via the plurality of receive paths into a combined signal routed to a signal processing chain including the LNA 510, the PA 535, and the divider circuit 525. The divider circuit 525 divides the combined signal of the signal processing chain to a plurality of transmit paths corresponding to a plurality of antennas 550 of the transmission antenna array. For example, the divider circuit 525 divides the combined signal of the signal processing chain to a transmit path including phase shifter 545-a and antenna 550-a. Further, the divider circuit 525 divides the combined signal of the signal processing chain to a transmit path including phase shifter 545-b and antenna 550-b. TX beam controller 560 signals the phase shifters 545 to control beam width and/or direction for retransmission of signals at the antennas 550.

In some cases, the signal processing chain includes a feedback path including the power detector 565 coupled to a gain controller 570. The power detector receives a signal from the divider circuit 525, and the signal may include the output of the PA 535. Based on the detected output, gain controller 570 may adjust a gain of PA driver 530 to the PA 535 and/or the LNA 510 to increase or maintain stability of signal transmission within the signal processing chain.

Figure 6:
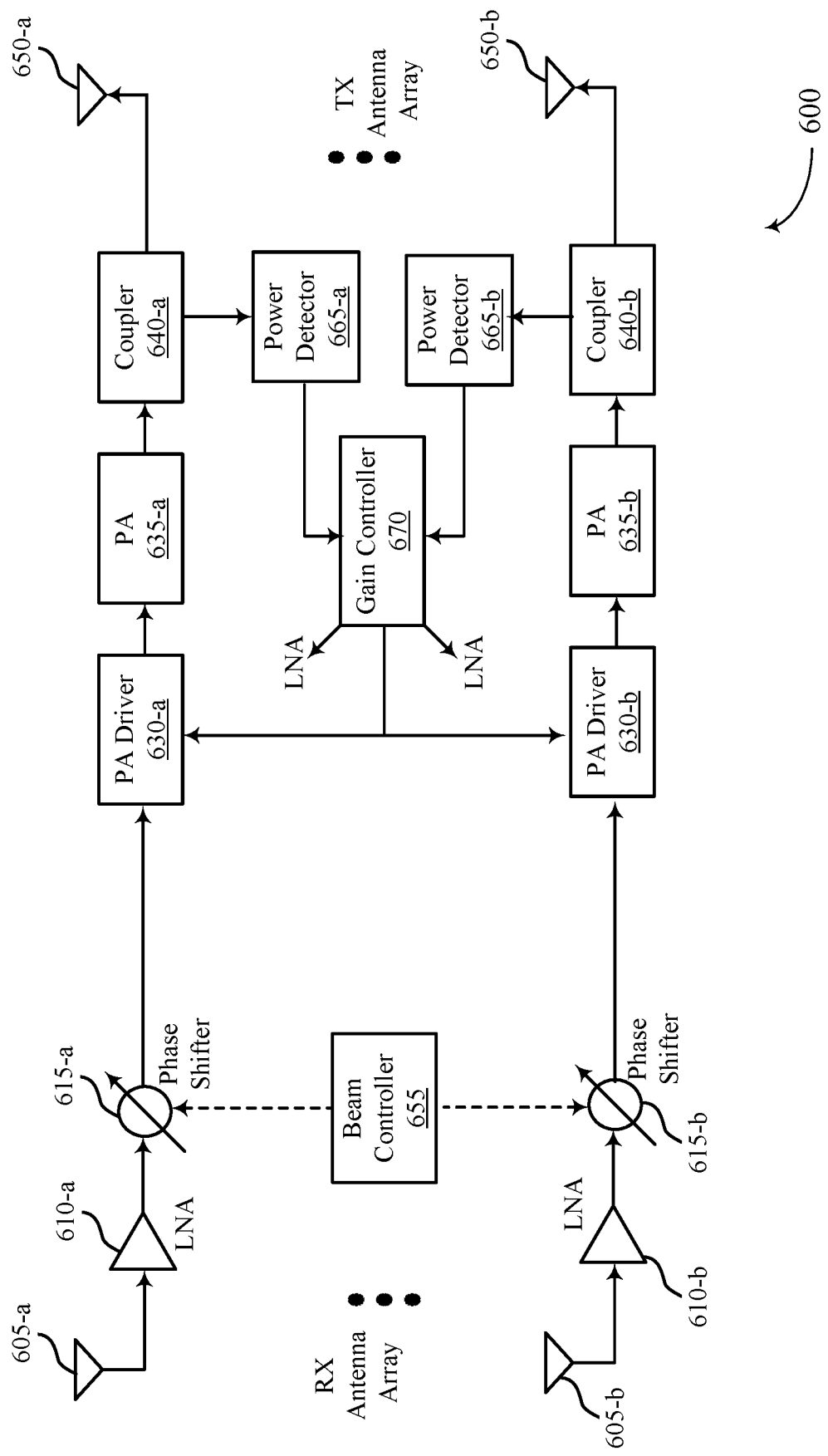

FIG. 6 illustrates an example of a circuit diagram 600 of a signal processing chain that supports a configurable beamforming repeater in accordance with aspects of the present disclosure. In some examples, signal processing chain may implement aspects of wireless communications system 100. The various components, including transmission lines, LNAs 610, phase shifters 615, PA drivers 630, PAs 635, couplers 640, beam controller 655, gain controller 670, and power detectors 665 between the RX antenna array including antennas 605 and the TX antenna array including antennas 650 may be considered the signal processing chain and may be implemented as a RFIC. Accordingly, the signal processing chain may include connection points between the antennas 605 and 650 and the components of the signal processing chain.

A plurality of transmit paths corresponding to respective RX antennas 605 of the RX antenna array include LNAs 610 and phase shifters 615, which may function to pre-process the signals resulting in a plurality of pre-processed instances of the signal routed through the transmit paths to corresponding antennas 650 of the TX antenna array. Each transmit path includes the respective LNAs 610, phase shifter 615, power amplifier driver 630, and PA 635. For example, based on beam controller 655 signals applied to the phase shifter 615-a, the antenna 605-a may receive a signal, which is routed to the phase shifter 615-a of the respective transmit path as a pre-processed instance of the signal. The signal is routed to the PA driver 630-a, PA 635-a, coupler 640-a, and to the antenna 650-a for retransmission. Similarly, based on beam controller 655 signals applied to the phase shifter 615-b, the antenna 605-b may receive a signal, which is routed to the phase shifter 615-b of the respective transmit path as a pre-processed instance of the signal. The signal is routed to the PA driver 630-b, PA 635-b, coupler 640-b, and to the antenna 650-b for retransmission. Respective feedback paths are connected to the couplers 640 and to gain controller 670, which may adjust a gain to the PA drivers 630 and/or the LNAs 610 based on an output of the PAs 635 as detected by the power detectors 665. For example, power detector 665-a is coupled to the transmit path via coupler 640-a and is configured to detect output of the PA 635-a. The gain controller 670 may adjust the gain to the PA driver 630-a and/or the LNA 610-a based on the detected output. Similarly, the power detector 665-b is coupled to the transmit path via coupler 640-b and is configured to detect output of the PA 635-b. The gain controller may adjust the gain to the PA driver 630-*b* and/or the LNA 610-*b* based on the detected output.

Figure 7:
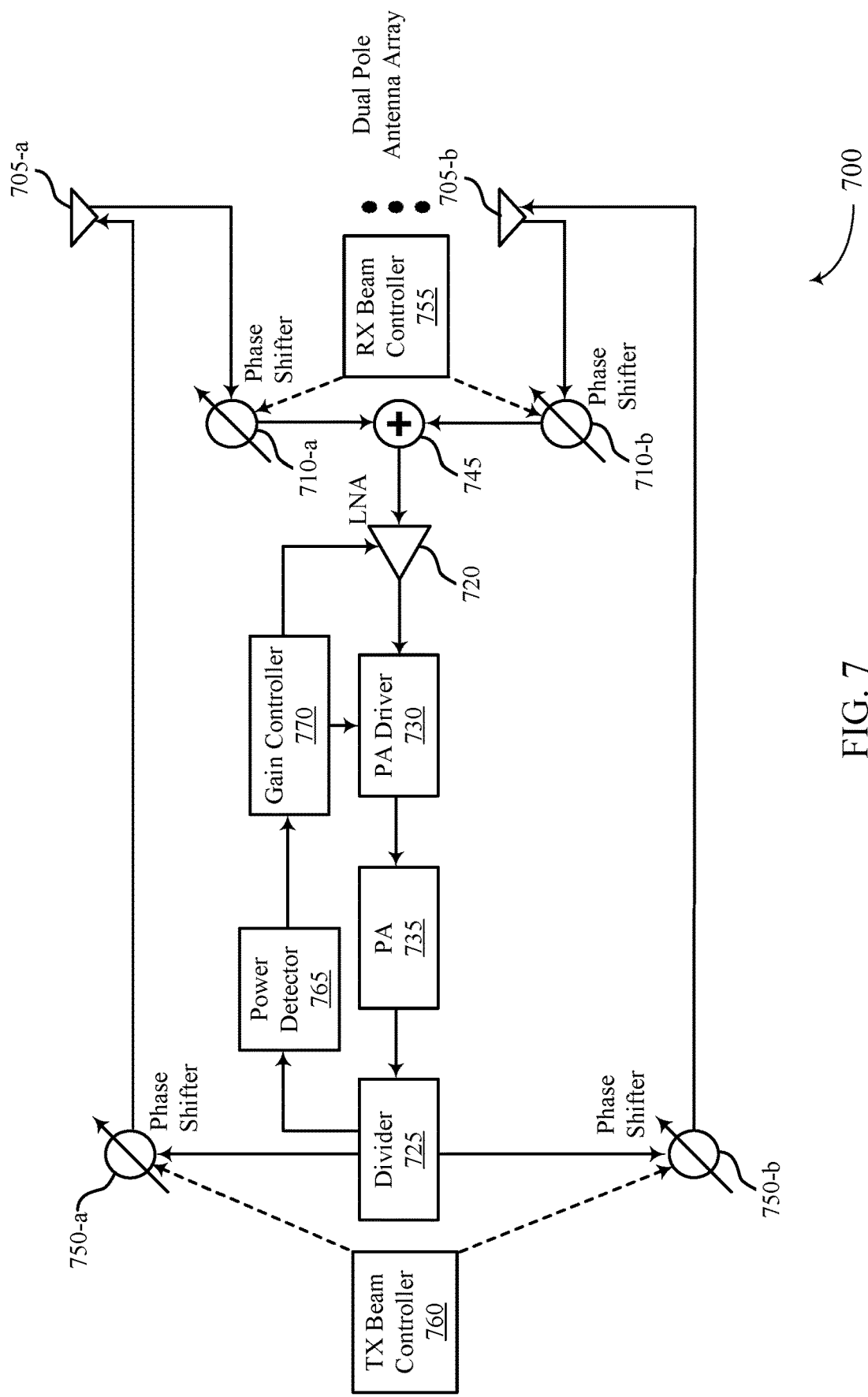

FIG. 7 illustrates an example of a circuit diagram 700 of a signal processing chain that supports a configurable beamforming repeater in accordance with aspects of the present disclosure. In some examples, signal processing chain may implement aspects of wireless communications system 100. The various components, including transmission lines, LNA 720, phase shifters 710 and 750, combiner circuit 745, divider circuit 725, PA driver 730, PA 735, RX beam controller 755, TX beam controller 760, gain controller 770, and power detector 765 between various antennas 705 of an antenna array may be considered the signal processing chain and may be implemented as a RFIC. Accordingly, the signal processing chain may include connection points between the antennas 705 and the components of the signal processing chain. The antennas 705 may be dual pole antennas. When the antennas 705 function in a first polarization, the antennas 705 may function as reception antennas, and when the antennas 705 function in a second polarization, the antennas may function as transmission antennas. Accordingly, the same set of antennas 705 may be considered a reception antenna array and a transmission antenna array, dependent on the polarity. It should be understood that the antennas 705 may function in different polarizations simultaneously or contemporaneously.

Signals received at the antennas 705 may be preprocessed at receive paths including phase shifters 710 corresponding to each of the plurality of dual pole antennas 705 functioning in the first polarization to comprise the first antenna array, and the pre-processing may result in a plurality of pre-processed instances of the signal. Combiner circuit 745 receives the plurality of pre-processed instances of the signal from the receive paths into a combined signal, which is routed to a transmission path. The transmission path includes LNA 720, PA driver 730, PA 735. Divider circuit 725 may divide the combined signal of the transmission path to a plurality of transmit paths corresponding to the plurality of dual pole antennas 705 functioning in the second polarization to comprise the transmission antenna array. The transmit paths include phase shifters 750-*b*, which are connected to each of the plurality of dual pole antennas 705 via the second polarization and are controlled by the TX controller 760.

A feedback path including power detector 765 and gain controller 770 is coupled to the signal processing chain at the divider circuit 725. The gain controller 770 monitors an output of the PA 735 via power detector 765. The gain controller 770 may adjust the gain of the PA driver 730 based on an output of the PA 735 to improve or maintain stability within the signal processing chain. In some cases, the gain controller 770 may adjust the gain to the LNA 720 based on an output of the PA 735.

As an example signal route in the circuit diagram, the antenna 705-*a* (e.g., functioning in a first polarization) may receive a beamformed signal from a device (e.g., base station 105 or UE 115) based on a beam configuration adjusted via the phase shifter 710-*a* and beam controller 755. The received signal is routed to the combiner circuit 745, through the transmission path including the PA driver 730, PA 735, and divider circuit 725 to transmit path including phase shifter 750-*a*, and back to the antenna 705-*a* functioning in a second polarization. Similarly, the antenna 705-*b* (e.g., functioning in a first polarization) may receive a beamformed signal from a device (e.g., base station 105 or UE 115) based on a beam configuration adjusted via the phase shifter 710-*b* and beam controller 755. The received signal is routed to the combiner circuit 745, through the transmission path including the PA driver 730, PA 735, and divider circuit 725, to transmit path including phase shifter 750-*b*, and back to the antenna 705-*b* for transmission by the antenna 705-*b* functioning in a second polarization.

Figure 8:
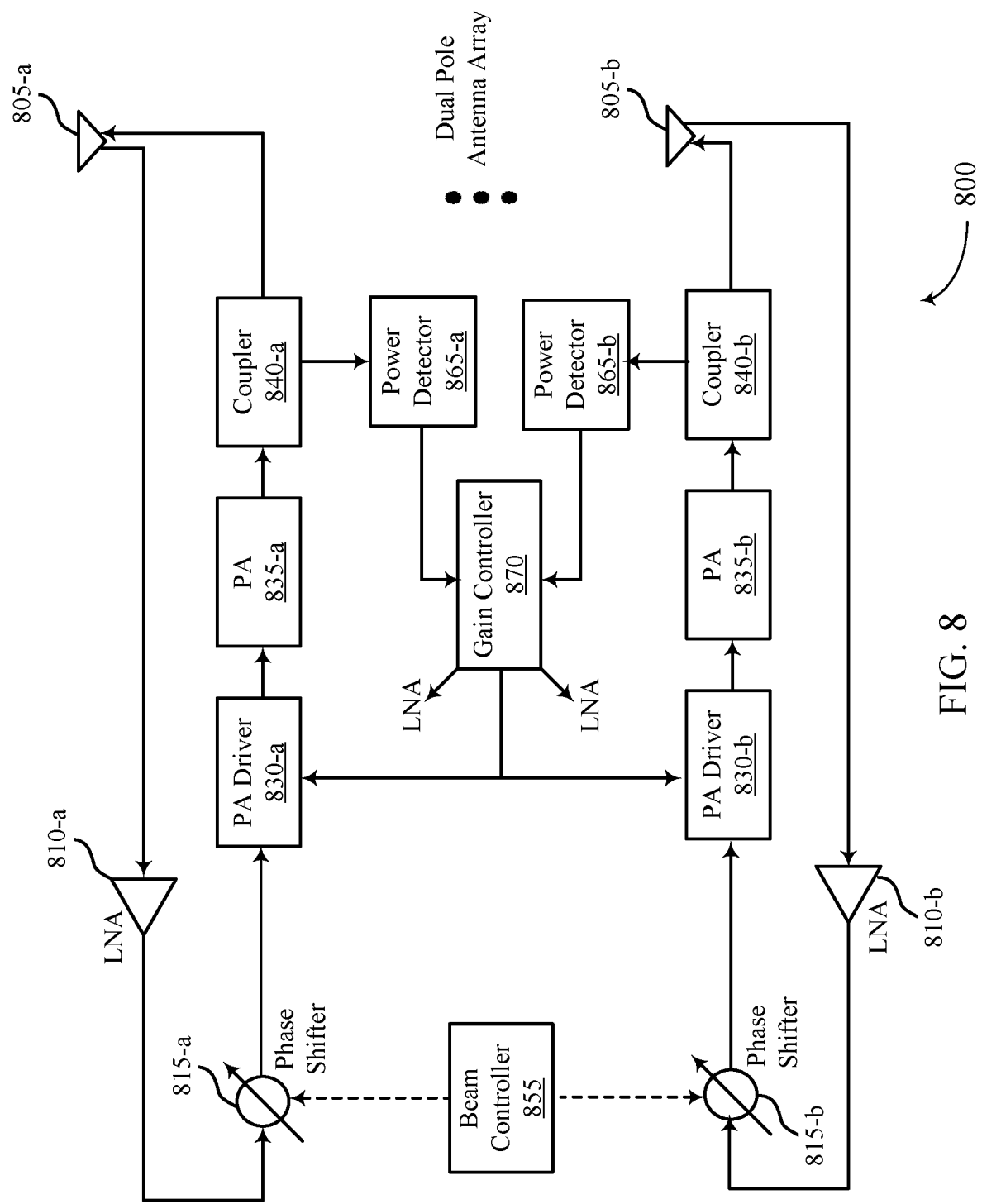

FIG. 8 illustrates an example of a circuit diagram of a signal processing chain 800 that supports a configurable beamforming repeater in accordance with aspects of the present disclosure. In some examples, signal processing chain 800 may implement aspects of wireless communications system 100. The various components, including transmission lines, LNAs 810, phase shifters 815, PA drivers 830, PAs 835, beam controller 855, gain controller 870, and power detectors 865 between various antennas 805 of an antenna array may be considered the signal processing chain and may be implemented as a RFIC. Accordingly, the signal processing chain may include connection points between the antennas 805 and the components of the signal processing chain. The antennas 805 may be dual pole antennas. When the antennas 805 function in a first polarization, the antennas 805 may function as reception antennas, and when the antennas 805 function in a second polarization, the antennas may function as transmission antennas. Accordingly, the same set of antennas 805 may be considered a reception antenna array and a transmission antenna array, dependent on the polarity. It should be understood that the antennas 805 may function in different polarizations simultaneously or contemporaneously.

Signals received at the antennas 805 may be preprocessed at transmit paths including LNAs 810 and phase shifters 815 corresponding to each of the plurality of dual pole antennas 805 functioning in the first polarization to comprise the reception antenna array, and the pre-processing may result in a plurality of pre-processed instances of the signal routed through the plurality of transmit paths corresponding to each of the plurality of dual pole antennas 805 functioning in the second polarization to comprise the transmission antenna array. Each transmit path may include a respective PA driver 830, a PA 835, and a coupler 840.

A plurality of feedback paths are connected to each of the plurality of transmit paths. Each of the feedback paths include a respective power detector 865, which route the output of the PA 835 (e.g., via couplers 840-*a*) to gain controller 870. The gain controller 870 monitors outputs of the PAs 835 via power detectors 865. The gain controller 870 may adjust the gain of the PA drivers 830 based on an output of the PAs 835 to improve or maintain stability within the signal processing chain. In some cases, the gain controller 870 may adjust the gain to the LNAs 810 based on an output of the PAs 835.

As an example signal route in the circuit diagram, the antenna 805-*a* (e.g., functioning in a first polarization) may receive a beamformed signal from a device (e.g., base station 105 or UE 115) based on a beam configuration adjusted via the phase shifter 815-*a* and beam controller 855. The received signal is routed to LNA 810-*a*, phase shifter 815-*a*, PA driver 830-*a*, PA 835-*a*, coupler 840-*a*, and back to antenna 805-*a*. The power detector 865-*a* detects the output of the PA 835-*a* via coupler 840-*a*, which is routed to the gain controller 870. Similarly, the antenna 805-*b* (e.g., functioning in a first polarization) may receive a beamformed signal from a device (e.g., base station 105 or UE 115) based on a beam configuration adjusted via the phase shifter 815-*b* and beam controller 855. The received signal is routed to LNA 810-*b*, phase shifter 815-*b*, PA driver 830-*b*, PA 835-*b*, coupler 840-*b*, and back to antenna 805-*b*.

The power detector 865-*b* detects the output of the PA 835-*b* via coupler 840-*b*, which is routed to the gain controller 870.

Figure 9:
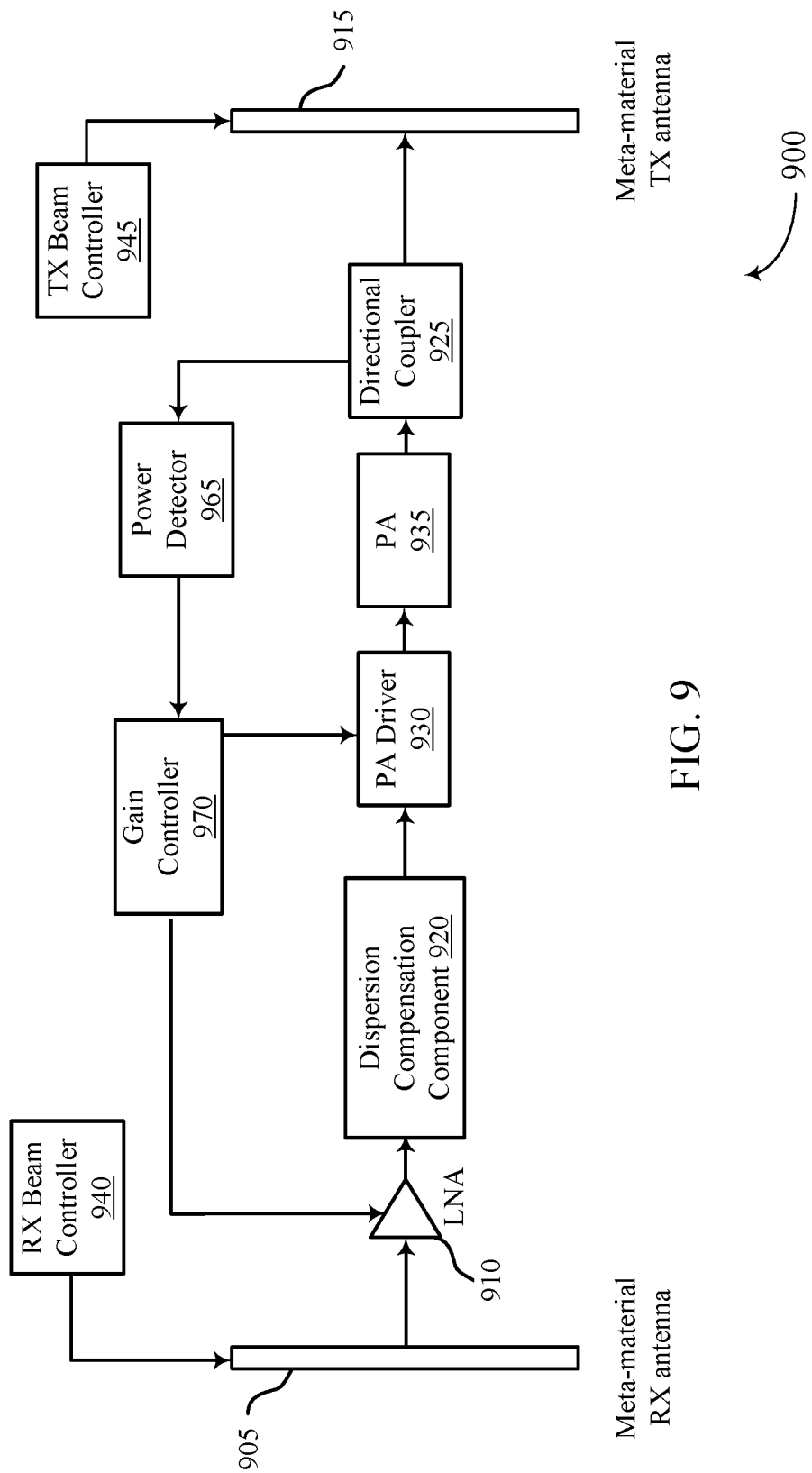

FIG. 9 illustrates an example of a circuit diagram 900 of a configurable beamforming repeater in accordance with aspects of the present disclosure. In some examples, signal processing chain may implement aspects of wireless communications system 100. The various components, including transmission lines, LNA 910, dispersion compensation component 920, PA driver 930, PA 935, directional coupler 925, reception beam controller 940, transmission beam controller 940, gain controller 970, and power detector 965 between meta-material RX antenna 905 and meta-material TX antenna 915 may be considered the signal processing chain and may be implemented as a RFIC. Accordingly, the signal processing chain may include connection points between the antennas 905 and 915 and the components of the signal processing chain.

The meta-material RX antenna 905 and the meta-material TX antenna 915 may exhibit negative permittivity and/or permeability, which may yield a negative refractive index. Hence, the antennas may produce a lens capability, which may assist in beamforming. The refractive index of the antennas 905 and 915 may be electrically tuned for controlling the beam configuration (e.g., width, direction, angle) by the respective controllers 940 and 945. In some cases, the antennas 905 and 915 may comprise an array of meta-material antennas, which may allow reduced spacing (e.g., less than $\lambda/2$).

Based on RX beam controller 940 signals applied to the meta-material RX antenna (or meta-material antenna array), the antenna 905-*a* may receive a signal (e.g., based on beam configuration), which is routed to the LNA 910. Similarly, based on RX beam controller 945 signals applied to the meta-material TX antenna 915 (or meta-material antenna array) the antenna 915 may transmit a signal according to a beam configuration If the antennas 905 and/or 915 include meta-material antennas configured in an array, the circuit diagram 900 may include a combiner circuit, as described herein to combine pre-processed instances of the signal into a combined signal, and/or a divider circuit to divide the signal to transmit paths corresponding to each meta-material antenna of the meta-material antenna array. The signal processing chain includes the LNA 910, dispersion compensation component 920, the PA 935, and the directional coupler 925. The dispersion compensation component 920 may correct the distortion introduced by the meta-material antenna using an RF or analog circuit. In some cases, the signal processing chain includes a feedback path including the power detector 965 coupled to a gain controller 970. The power detector 965 receives a signal from the directional coupler 925, and the signal may include the output of the PA 945. Based on the detected output, gain controller 970 may adjust a gain of PA driver 930 to the PA 935 and/or the LNA 910 to increase or maintain stability of signal transmission within the signal processing chain. In some cases, circuit diagram 900 may not include a feedback path when the circuit includes meta-material antennas 905 and 915.

Figure 10:
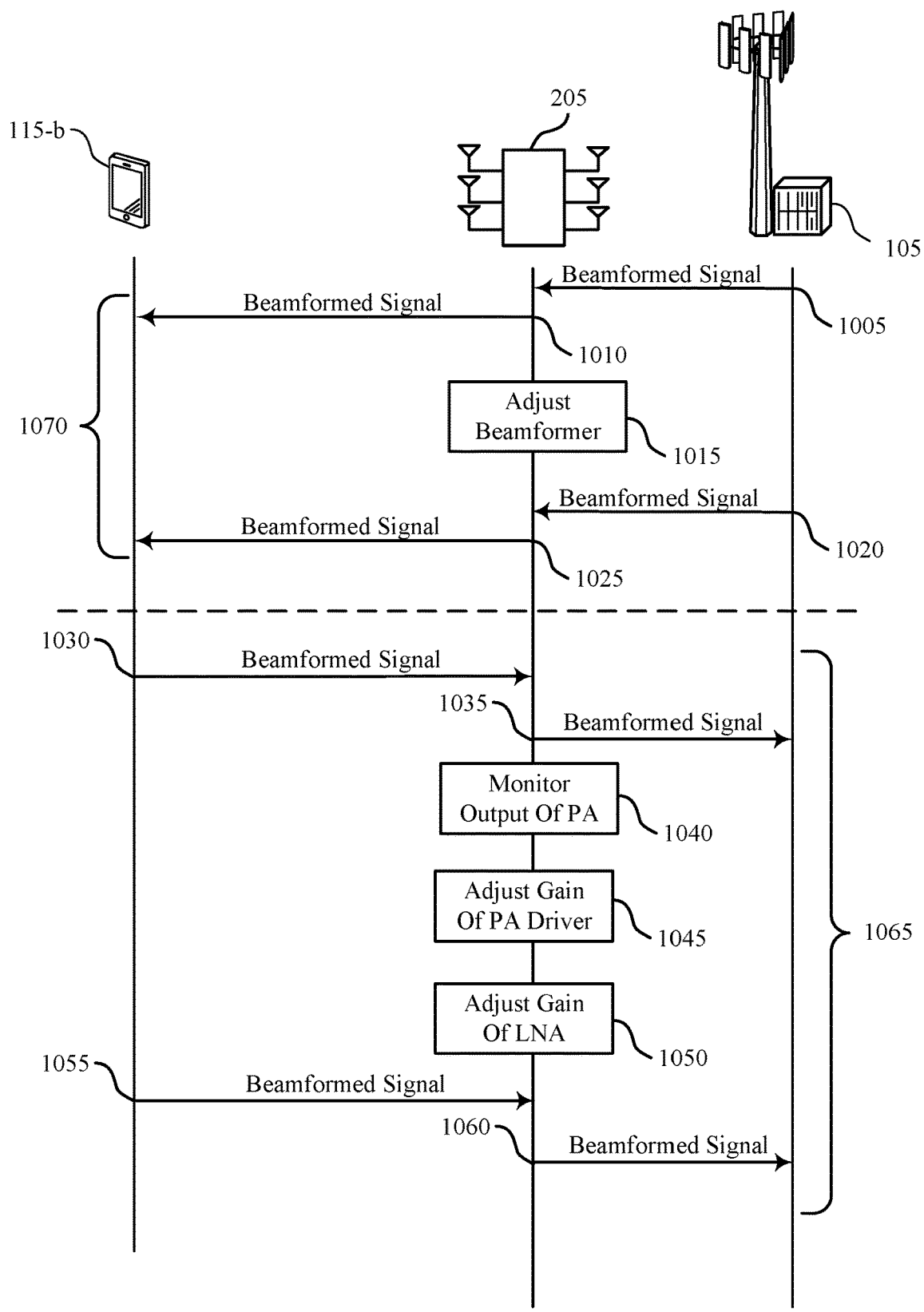
FIG. 10 illustrates an example of a process flow of a configurable beamforming repeater in accordance with aspects of the present disclosure.

FIG. 10 illustrates an example of a process flow 1000 of a configurable beamforming repeater in accordance with aspects of the present disclosure. In some examples, devices of process flow 1000 may implement aspects of wireless communications system 100. The process flow includes UE 115, repeater 205, and base station 105. It should be understood that the features of process flow 1000 may be implemented in uplink and downlink scenarios.

At 1005, base station 105 transmits a beamformed signal to the repeater 205, and the repeat receives the signal via directional beamforming at a first antenna array. The receiver side beamforming may be configured by a beam controller of the repeater. At 1010, the repeater 1005 retransmits the signal via directional beamforming at a second antenna array of the repeater 1005 to the UE 115. The angle or direction may be configured by a beam controller of the repeater 205.

At 1015, the repeater 205 adjusts at least one of the receiver side beamformer for receiving the signal or the transmit side beamformer for retransmitting the signal in order to reduce signal interference caused by the retransmitting. The beamformers may correspond to the beam controllers as described with respect to FIGS. 2-9. The beam width and/or direction may be adjusted to avoid the signal interference caused by the retransmitting. At 1020, the base station 105 transmits a signal, and the wireless repeater 1005 receives the signal via one or more receive beams. The angle or direction of the beamformer may be configured based on the adjustment at 1015. At 1025, the repeater 205 retransmits the received signal to UE 115 via directional beamforming. The directional beamforming for retransmitting may be configured based on the adjustment at 1015. Operations 1070 may comprise a beam adjustment process and may be continuously or periodically repeated based on operational environments. The operations 1070 may be performed in downlink (e.g., base station 105 to repeater 205 to UE 115) and in uplink (e.g., UE 115 to repeater 205 to base station 105).

At 1030, the UE 115 transmits a signal to the repeater 205, and the repeater 205 receives the signal from the UE 115 via directional beamforming at a first antenna array. At 1035, the repeater 205 retransmits the signal to the base station 105 via a second antenna array according to directional beamforming.

At 1040 and during retransmission at 1030, the repeater 205 monitors an output of a PA of the repeater 205. The output may be monitored via a feedback path in a signal processing chain of the repeater. At 1045, the repeater adjusts a gain of a PA driver of the signal processing chain of the repeater based on the output of the PA. At 1050, the repeater 205 adjusts a gain of one or more LNAs of the signal processing chain of the repeater based on the output of the PA. The gain of the driver and/or the gain of the LNAs may be adjusted to maintain or improve signal transmission stability within the repeater, which may result in improved signal quality in the reception beam and/or transmit beam. At 1055, the UE 115 transmits a signal to the repeater 205, and the repeater 205 receives the signal according to one or more receive beams. At 1060, the repeater 1005 retransmits the signal to the base station 105 via directional beamforming. Operations 1065 may comprise an automatic gain adjustment process via a feedback path. The operations 1065 may be performed in downlink (e.g., base station 105 to repeater 205 to UE 115) and in uplink (e.g., UE 115 to repeater 205 to base station 105). Operations 1065 and 1070 may be performed simultaneously or contemporaneously.

Figure 11:
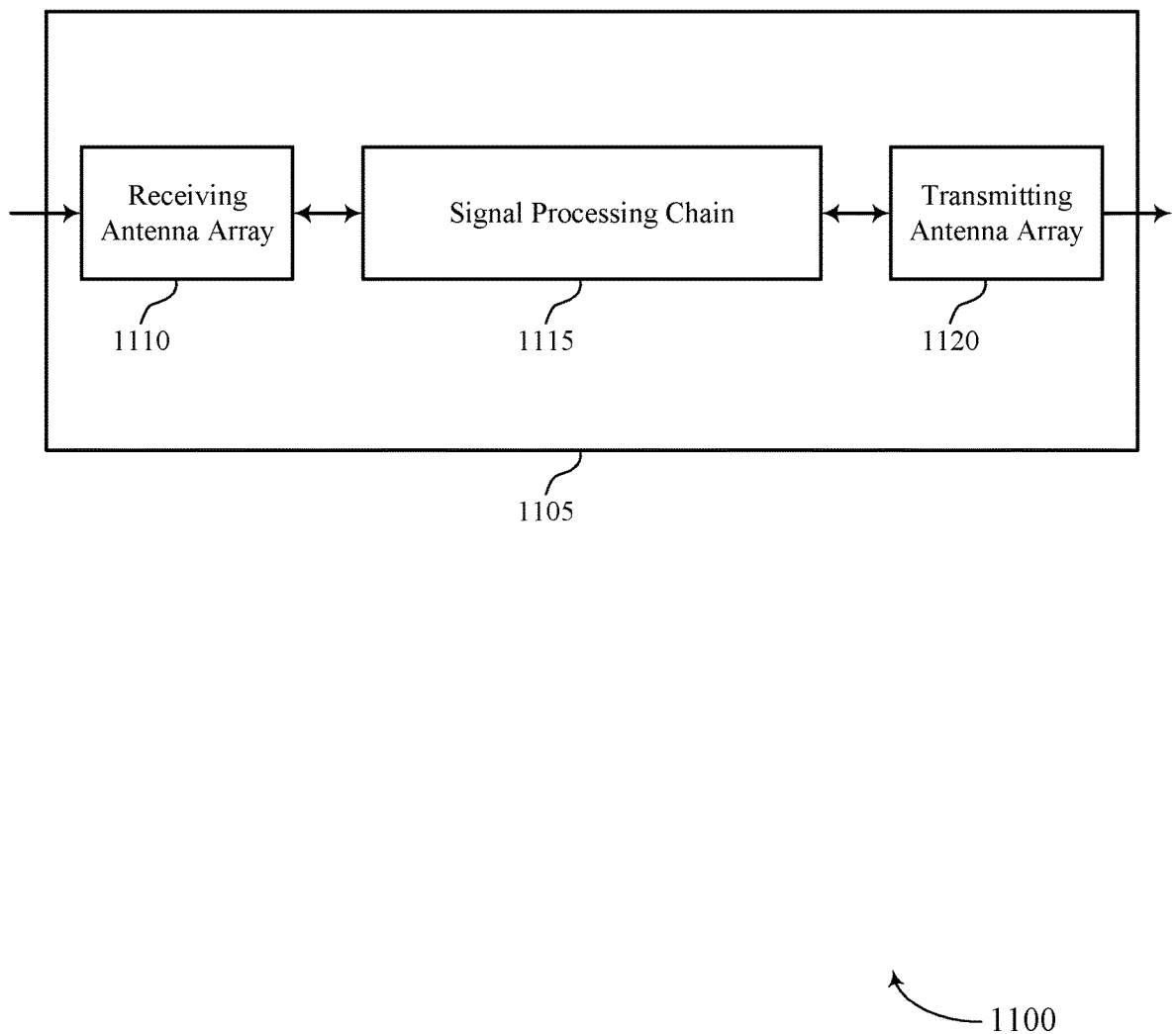
FIGS. 11 and 12 show block diagrams of devices that support configurable beamforming repeater in accordance with aspects of the present disclosure.

FIG. 11 shows a block diagram 1100 of a device 1105 as a configurable beamforming repeater in accordance with aspects of the present disclosure. The device 1105 may be an example of aspects of a UE 115 or a base station 110 as described herein. The device 1105 may include a receiving antenna array 1110, a signal processing chain 1115, and a transmitting antenna array 1120. The device 1105 may also include a processor. Each of these components may be in communication with one another (e.g., via one or more buses).

The receiving antenna array 1110 may receive RF signals and these signals may be passed on to other components of the device 1105. The receiving antenna array 1110 may utilize a set of antennas. The signal processing chain 1115, or its sub-components, may be implemented in hardware, and may include RF/microwave components, such as amplifiers, dividers and combiners. These may be implemented as part of an RF circuit with transistors. Examples of such RF circuits may include monolithic microwave integrated circuits (MMICs).

The signal processing chain 1115, or its sub-components, may be physically located at various positions, including being distributed such that portions of functions are implemented at different physical locations by one or more physical components. In some examples, the signal processing chain 1115, or its sub-components, may be a separate and distinct component in accordance with various aspects of the present disclosure. In some examples, the signal processing chain 1115, or its sub-components, may be combined with one or more other hardware components.

The transmitting antenna array 1120 may transmit signals generated by other components of the device 1105. In some examples, the transmitting antenna array 1120 may be collocated with a receiving antenna array 1110. The transmitting antenna array 1120 may utilize set of antennas.

Figure 12:
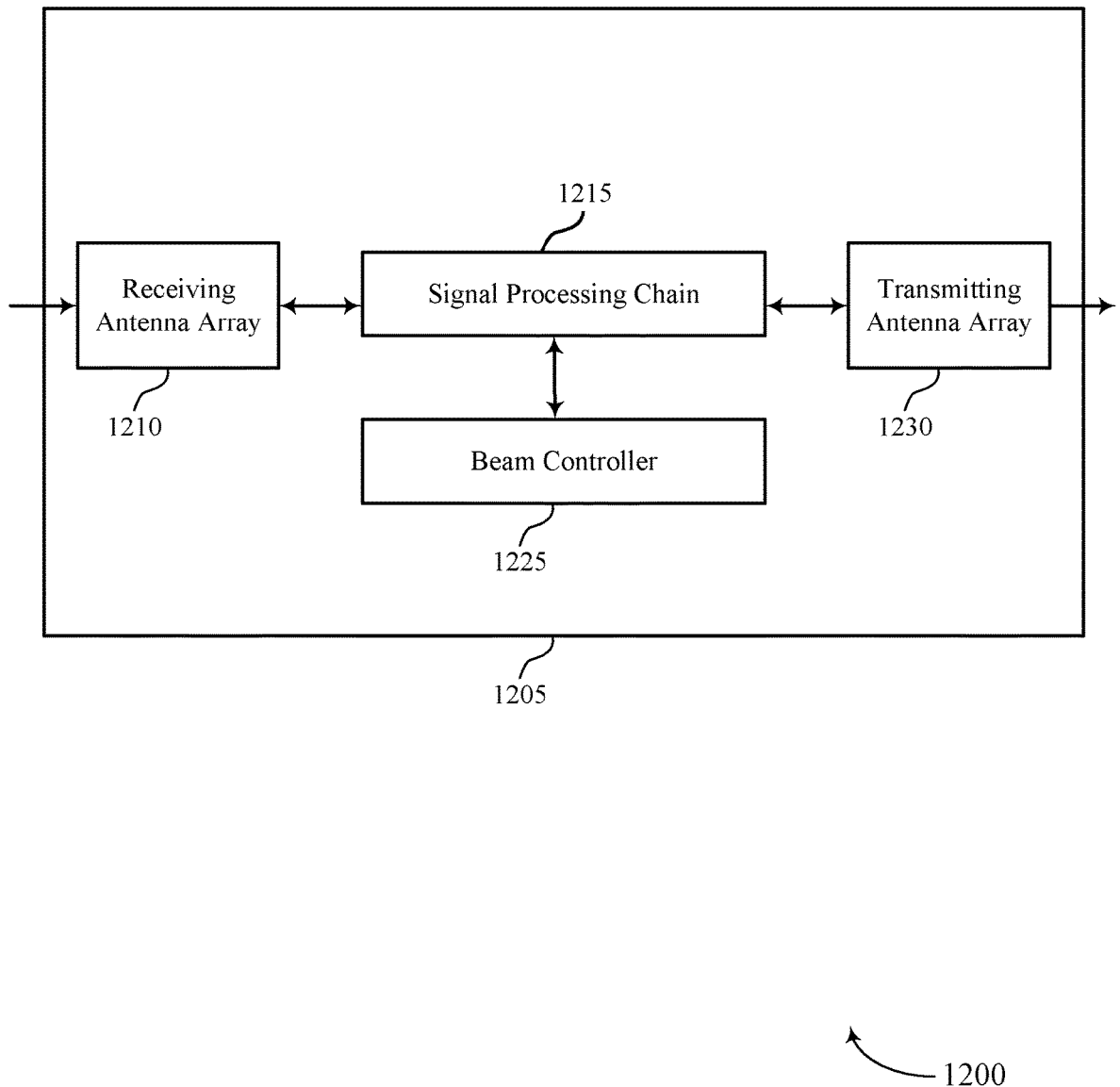

FIG. 12 shows a block diagram 1200 of a device 1205 as a configurable beamforming repeater in accordance with aspects of the present disclosure. The device 1205 may be an example of aspects of a device 1105, or a UE 115 as described herein. The device 1205 may include a receiving antenna array 1210, a signal processing chain 1215, and a transmitting antenna array 1230.

The receiving antenna array 1210 may receive RF signals encoding and these signals may be passed on to other components of the device 1205. The receiving antenna array 1210 may utilize set of antennas. In some cases, the receiving antenna array 1210 comprises a meta-material antenna or antenna array.

The signal processing chain 1215 may be an example of aspects of the signal processing chain 1115 as described herein. The device 1205 may include a beam controller 1225. The signal processing chain 1215 may be an example of aspects of the signal processing chain 1215 described herein.

The signal processing chain 1215 may receive, at a first antenna array (e.g., the receiving antenna array 1210), a signal via directional beamforming and retransmit the signal via directional beamforming at a second antenna array (e.g., the transmitting antenna array 1230) of the wireless repeater. The beam controller 1225 may adjust the scan angle or direction of the beamformer for receiving the signal or retransmitting the signal in order to reduce signal interference caused by the retransmitting. Adjusting the angle or direction of the beamformer may include adjusting, via a beam controller (e.g., beamformer), the directional beamforming for receiving the signal or transmitting the signal in order to reduce signal interference caused by the retransmitting.

The transmitting antenna array 1230 may transmit signals generated by other components of the device 1205. In some examples, the transmitting antenna array 1230 may be collocated with a receiving antenna array 1210 in a transceiver. The transmitting antenna array 1230 may utilize a set of antennas. In some cases, the transmitting antenna array 1230 comprises a meta-material antenna or antenna array.

Figure 13:
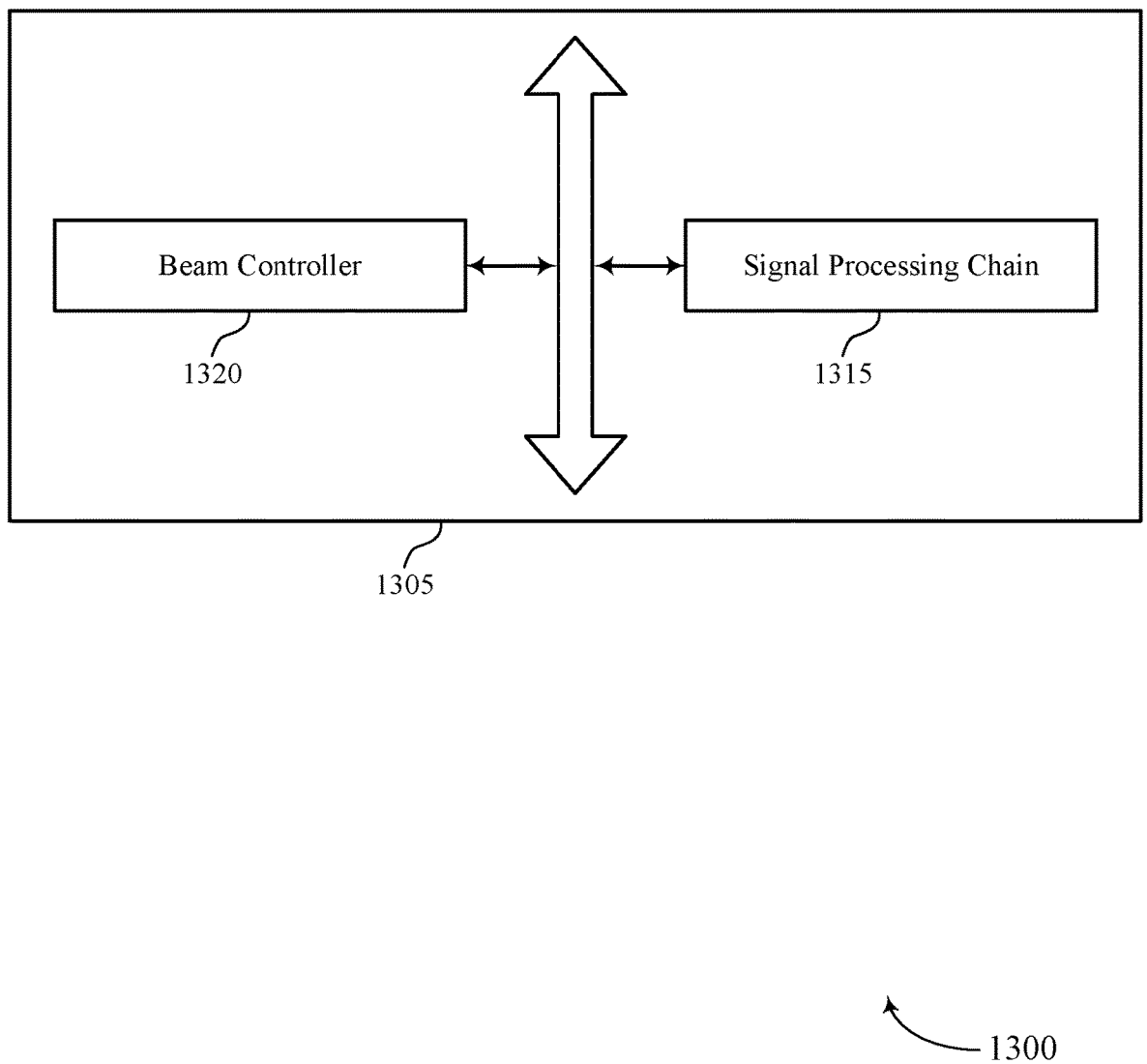
FIG. 13 shows a block diagram of a device that supports a configurable beamforming repeater in accordance with aspects of the present disclosure.

FIG. 13 shows a block diagram 1300 of a device 1305 that supports a configurable beamforming repeater in accordance with aspects of the present disclosure. The device 1305 may be an example of aspects of a device 1105, or a device 1205 described herein. The device 1305 may include a signal processing chain 1315 and a beam controller 1320. The signal processing chain 1315 may be an example of aspects of signal processing chains 1115, 1215, 215, or the various circuitry illustrated in FIGS. 4-8.

The device 1305 may receive, at a first antenna array of the wireless repeater, a signal via directional beamforming. In some examples, the device 1305 may retransmit the signal via a beamforming at a second antenna array of the wireless repeater. The beam controller 1320 may adjust the direction (or scan angle) of the beamformer for receiving the signal or retransmitting the signal in order to reduce signal interference caused by the retransmitting. In some cases, the first antenna array includes an dual pole antenna array functioning in a first polarization and the second antenna array includes the dual pole antenna array functioning in a second polarization. In some cases, the first antenna array and/or the second antenna array comprises a meta-material antenna or antenna array.

A power detector of the signal processing chain 1315 may monitor an output of at least one power amplifier (PA) of a signal processing chain connected to route the signal between reception at the first antenna array and retransmission at the second antenna array. In some examples, a gain controller of the signal processing chain 1315 may adjust, based on the output, a gain of a PA driver to the PA. In some examples, the gain controller of the signal processing chain 1315 may adjust, based on the output, a gain of at least one low noise amplifier (LNA) connected to the first antenna array. In some examples, the signal processing chain 1315 may monitor the output of the at least one PA via a feedback path connected to the signal processing chain between the first antenna array and the second antenna array. In some cases, the feedback path includes a coupler for connecting to the signal processing chain, a power detector for monitoring the output of the PA, and a gain controller for adjusting the gain of the PA driver to the PA. In some examples, a gain controller of the signal processing chain 1315 may adjust the gain of the PA driver to the PA and to adjust a gain of one or more low noise amplifiers (LNAs) coupled to respective antennas of the first antenna array.

In some examples, the signal processing chain 1315 may pre-process the signal via respective low noise amplifiers (LNAs) and phase shifters that correspond to each antenna of the first antenna array, the pre-processing resulting in a set of pre-processed instances of the signal. In some examples, a combiner circuit of the signal processing chain 1315 may combine the set of pre-processed instances of the signal into a combined signal. In some examples, a divider circuit of the signal processing chain 1315 may divide the combined signal to a set of transmit paths corresponding to a set of antennas of the second antenna array, each transmit path including at least a power amplifier driver and a power amplifier (PA). In some examples, power detectors of the signal processing chain 1315 may monitor respective outputs of the PAs of each transmit path. In some examples, gain controllers of the signal processing chain 1315 may adjust, based on the respective outputs, a gain of respective PA drivers in the transmit paths.

In some examples, phase shifters (of the signal processing chain 1315) corresponding to each antenna of the first antenna array may pre-process the signal that correspond to each antenna of the first antenna array, the pre-processing resulting in a set of pre-processed instances of the signal. In some examples, a combiner circuit of the signal processing chain 1315 may combine the set of pre-processed instances of the signal into a combined signal to a signal processing chain, the signal processing chain including at least a low noise amplifier (LNA), a power amplifier driver, and a power amplifier (PA). In some examples, a divider circuit of the signal processing chain 1315 may divide the combined signal to a set of transmit paths corresponding to a set of antennas of the second antenna array. In some examples, power detectors of the signal processing chain 1315 may monitor, an output of the PA of the signal processing chain. In some examples, gain controllers of the signal processing chain 1315 may adjust, based on the output, a gain of the power amplifier driver to the PA.

In some examples, the signal processing chain 1315 may pre-process the signal via respective phase shifters that correspond to each antenna of the first antenna array, the pre-processing resulting in a set of pre-processed instances of the signal routed to a set of transmit paths corresponding to a set of antennas of the second antenna array, each transmit path including at least a power amplifier driver and a power amplifier (PA). In some examples, power detectors of the signal processing chain 1315 may monitor respective outputs of the PAs of each transmit path. In some examples, gain controllers of the signal processing chain 1315 may adjust, based on the respective outputs, a gain of respective PA drivers in the transmit paths.

In some examples, the signal processing chain 1315 may pre-process the signal via respective phase shifters that correspond to each of a set dual pole antennas functioning in a first polarization to include the first antenna array, the pre-processing resulting in a set of pre-processed instances of the signal. In some examples, a combiner circuit of the signal processing chain 1315 may combine the set of pre-processed instances of the signal into a combined signal to a transmission path, the transmission path including at least a low noise amplifier (LNA), a power amplifier driver, and a power amplifier (PA). In some examples, a divider circuit of the signal processing chain 1315 may divide the combined signal to a set of transmit paths corresponding to the set of dual pole antennas functioning in a second polarization to include the second antenna array. In some examples, power detectors of the signal processing chain 1315 may monitor, an output of the PA of the transmission path. In some examples, a gain controller of the signal processing chain 1315 may adjust, based on the output, a gain of the PA driver.

In some examples, components of the signal processing chain 1315 may pre-process the signal via respective phase shifters and low noise amplifiers (LNAs) that correspond to each dual pole antenna functioning in a first polarization to include the first antenna array, the pre-processing resulting in a set of pre-processed instances of the signal routed to a set of transmit paths corresponding to each of the dual pole antennas functioning in a second polarization to include the second antenna array, each transmit path including at least a power amplifier driver and a power amplifier (PA), where the first antenna array and the second antenna array include a same set of dual pole antennas. In some examples, power detectors of the signal processing chain 1315 may monitor respective outputs of the PAs of each transmit path. In some examples, gain controllers of the signal processing chain 1315 may adjust, based on the respective outputs, a gain of respective PA drivers in the transmit paths.

Figure 14:
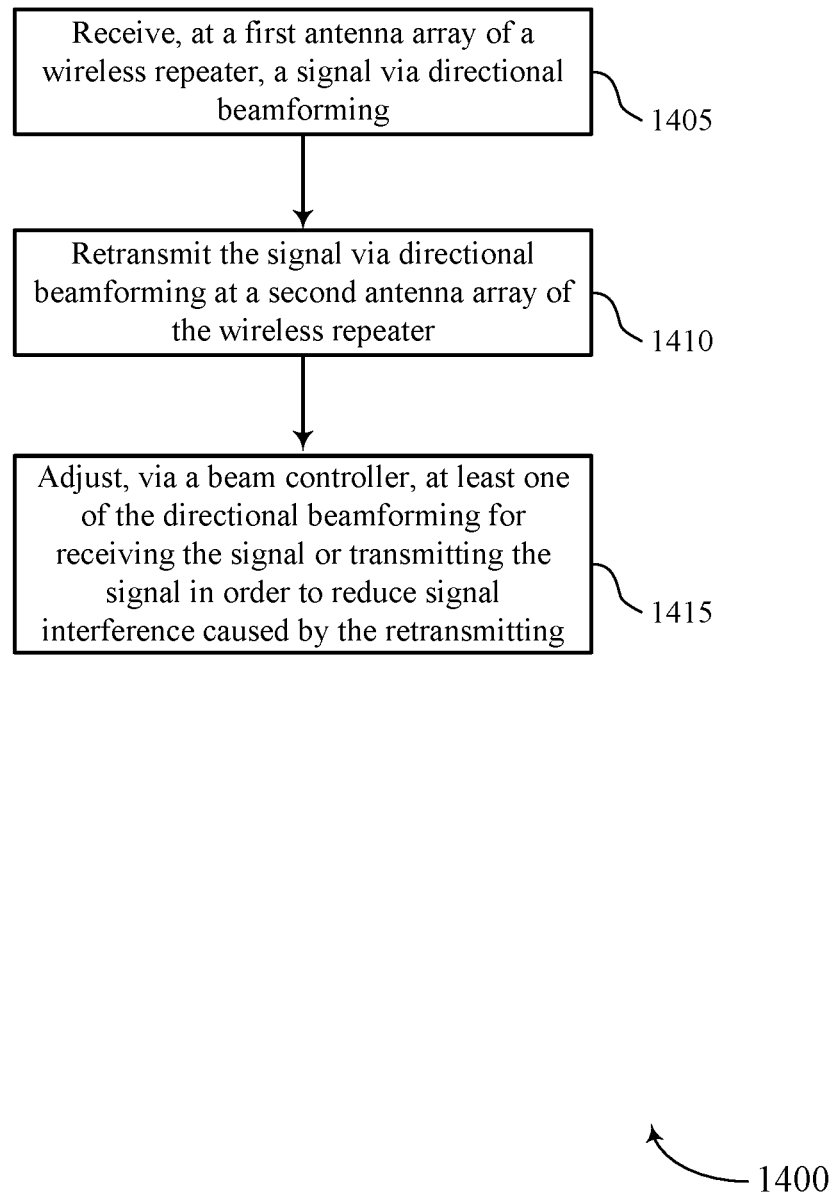
FIGS. 14 through 20 show signal processing flows illustrating methods that support configurable beamforming repeater in accordance with aspects of the present disclosure.

FIG. 14 shows a signal processing flow illustrating a method 1400 that supports a configurable beamforming repeater in accordance with aspects of the present disclosure. The operations of method 1400 may be implemented by a repeater 140 or its components as described herein. For example, the operations of method 1400 may be performed by a signal processing chain as described with reference to FIGS. 11 through 13.

At 1405, the repeater may receive, at a first antenna array of a wireless repeater, a signal via directional beamforming. Receiving a signal via directional beamforming may include beamforming the signal via one of several possible beam directions and/or widths by adjusting one or more phase shifters. The operations of 1405 may be performed according to the methods described herein. In some examples, aspects of the operations of 1405 may be performed by an antenna array as described with reference to FIGS. 11 through 13.

At 1410, the repeater may retransmit the signal via directional beamforming at a second antenna array of the wireless repeater. The operations of 1410 may be performed according to the methods described herein. In some examples, aspects of the operations of 1410 may be performed by an antenna array as described with reference to FIGS. 11 through 13.

At 1415, the repeater may adjust a direction or angle of a beamformer (e.g., beam controller) for receiving the signal or retransmitting the signal in order to reduce signal interference caused by the retransmitting. The adjusting may include, adjusting, via a beam controller, the directional beamforming for receiving the signal or transmitting the signal in order to reduce signal interference caused by the retransmitting. Adjusting the directional beamforming may include adjusting the receiving antenna array's beamformer and/or phase shifter. Similarly, adjusting directional beamforming for retransmitting may include adjusting the transmission antenna array's beamformer and/or phase shifter. The operations of 1415 may be performed according to the methods described herein. In some examples, aspects of the operations of 1415 may be performed by a beam controller as described with reference to FIGS. 11 through 13.

Figure 15:
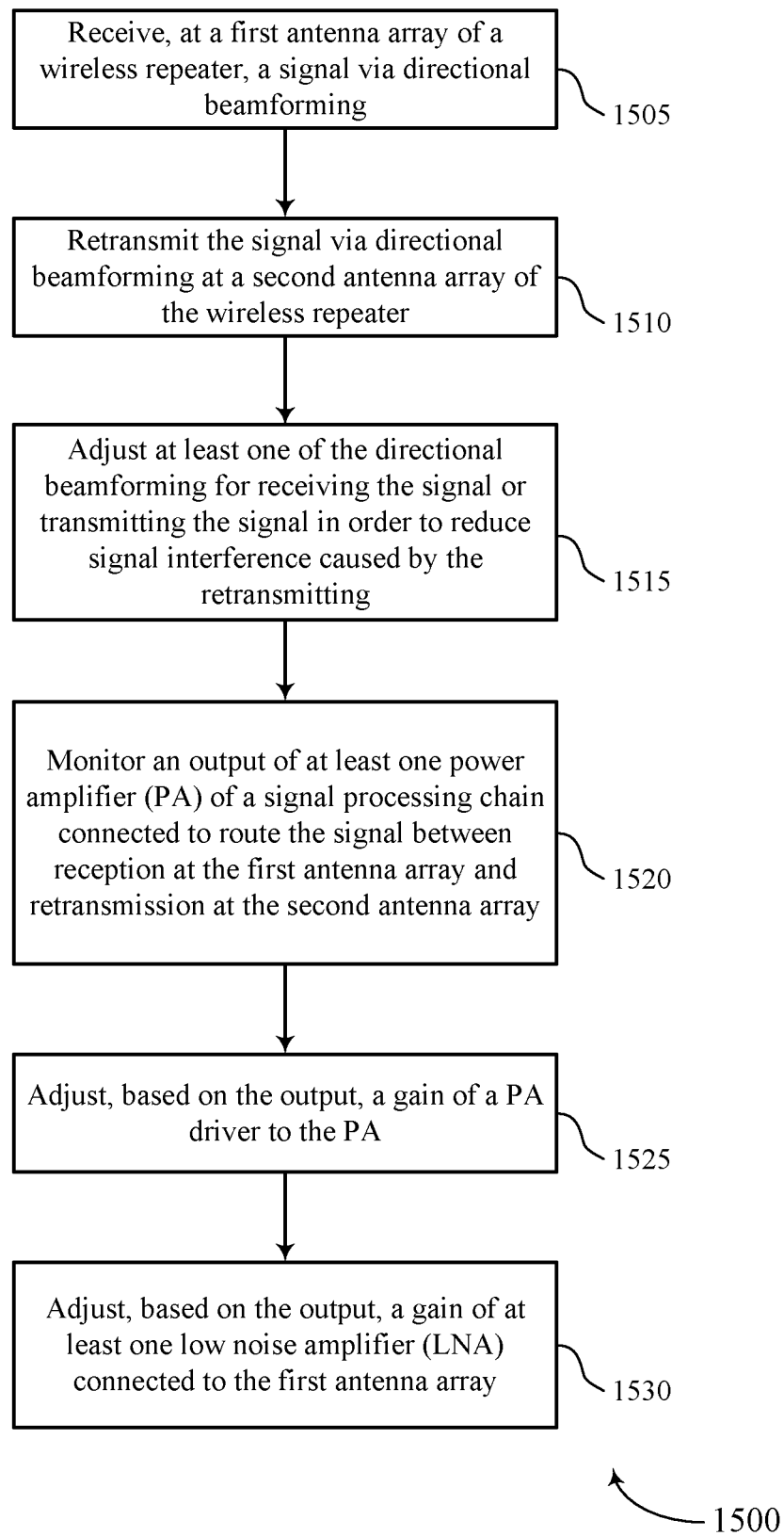

FIG. 15 shows a signal processing flow illustrating a method 1500 that supports a configurable beamforming repeater in accordance with aspects of the present disclosure. The operations of method 1500 may be implemented by a repeater 140 or its components as described herein. For example, the operations of method 1500 may be performed by a signal processing chain as described with reference to FIGS. 11 through 13.

At 1505, the repeater may receive, at a first antenna array of a wireless repeater, a signal via directional beamforming. Receiving a signal via directional beamforming may include beamforming the signal via one of several possible beam directions and/or widths by adjusting one or more phase shifters. The operations of 1505 may be performed according to the methods described herein. In some examples, aspects of the operations of 1505 may be performed by a signal processing chain as described with reference to FIGS. 11 through 13.

At 1510, the repeater may retransmit the signal via directional beamforming. The operations of 1510 may be performed according to the methods described herein. In some examples, aspects of the operations of 1510 may be performed by an signal processing chain as described with reference to FIGS. 11 through 13.

At 1515, the repeater may adjust the beamformer for receiving the signal or retransmitting the signal in order to reduce the signal interference caused by the retransmitting. Adjusting the directional beamforming for receiving the signal may include adjusting the receiving antenna array's beamformer and/or phase shifter. Similarly, adjusting the beamforming for retransmitting may include adjusting the transmission antenna array's beamformer and/or phase shifter. The operations of 1515 may be performed according to the methods described herein. In some examples, aspects of the operations of 1515 may be performed by a beam controller as described with reference to FIGS. 11 through 13.

At 1520, the repeater may monitor an output of at least one power amplifier (PA) of a transmission path connected to route the signal between reception at the first antenna array and retransmission at the second antenna array. The operations of 1520 may be performed according to the methods described herein. In some examples, aspects of the operations of 1520 may be performed by a signal processing chain as described with reference to FIGS. 11 through 13.

At 1525, the repeater may adjust, based on the output, a gain of a PA driver to the PA. The operations of 1525 may be performed according to the methods described herein. In some examples, aspects of the operations of 1525 may be performed by a signal processing chain as described with reference to FIGS. 11 through 13.

At 1530, the repeater may adjust, based on the output, a gain of at least one low noise amplifier (LNA) connected to the first antenna array. The operations of 1530 may be performed according to the methods described herein. In some examples, aspects of the operations of 1530 may be performed by a signal processing chain as described with reference to FIGS. 11 through 13.

Figure 16:
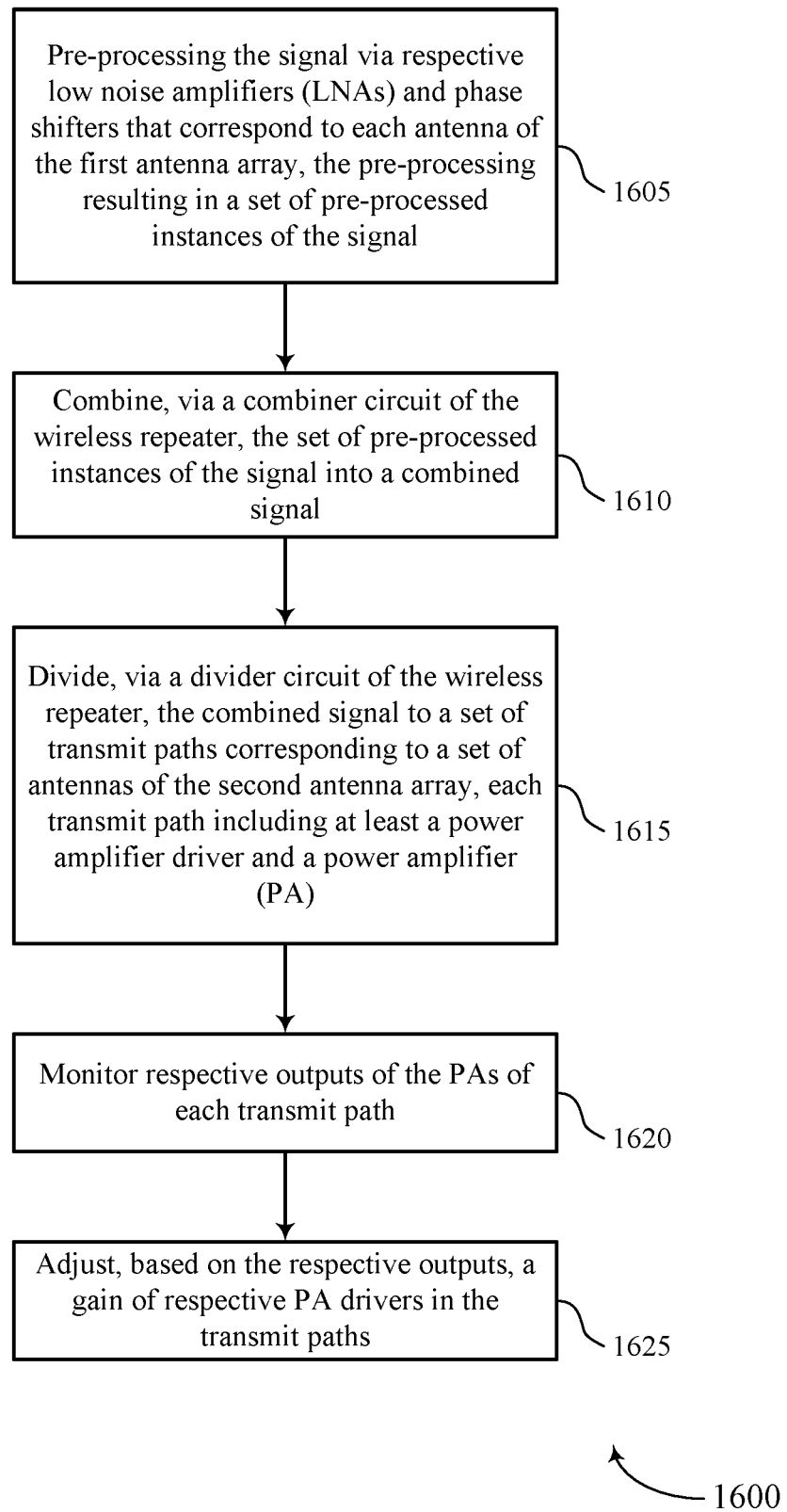

FIG. 16 shows a signal processing flow illustrating a method 1600 that supports a configurable beamforming repeater in accordance with aspects of the present disclosure. The operations of method 1600 may be implemented by a repeater 140 or its components as described herein. For example, the operations of method 1600 may be performed by a signal processing chain as described with reference to FIGS. 11 through 13.

At 1605, the repeater may pre-process the signal via respective low noise amplifiers (LNAs) and phase shifters that correspond to each antenna of the first antenna array, the pre-processing resulting in a set of pre-processed instances of the signal. The operations of 1605 may be performed according to the methods described herein. In some examples, aspects of the operations of 1605 may be performed by a signal processing chain as described with reference to FIGS. 11 through 13.

At 1610, the repeater may combine, via a combiner circuit of the wireless repeater, the set of pre-processed instances of the signal into a combined signal. The operations of 1610 may be performed according to the methods described herein. In some examples, aspects of the operations of 1610 may be performed by a signal processing chain as described with reference to FIGS. 11 through 13.

At 1615, the repeater may divide, via a divider circuit of the wireless repeater, the combined signal to a set of transmit paths corresponding to a set of antennas of the second antenna array, each transmit path including at least a power amplifier driver and a power amplifier (PA). The operations of 1615 may be performed according to the methods described herein. In some examples, aspects of the operations of 1615 may be performed by a signal processing chain as described with reference to FIGS. 11 through 13.

At 1620, the repeater may monitor respective outputs of the PAs of each transmit path. The operations of 1620 may be performed according to the methods described herein. In some examples, aspects of the operations of 1620 may be performed by a signal processing chain as described with reference to FIGS. 11 through 13.

At 1625, the repeater may adjust, based on the respective outputs, a gain of respective PA drivers in the transmit paths. The operations of 1625 may be performed according to the methods described herein. In some examples, aspects of the operations of 1625 may be performed by a signal processing chain as described with reference to FIGS. 11 through 13.

Figure 17:
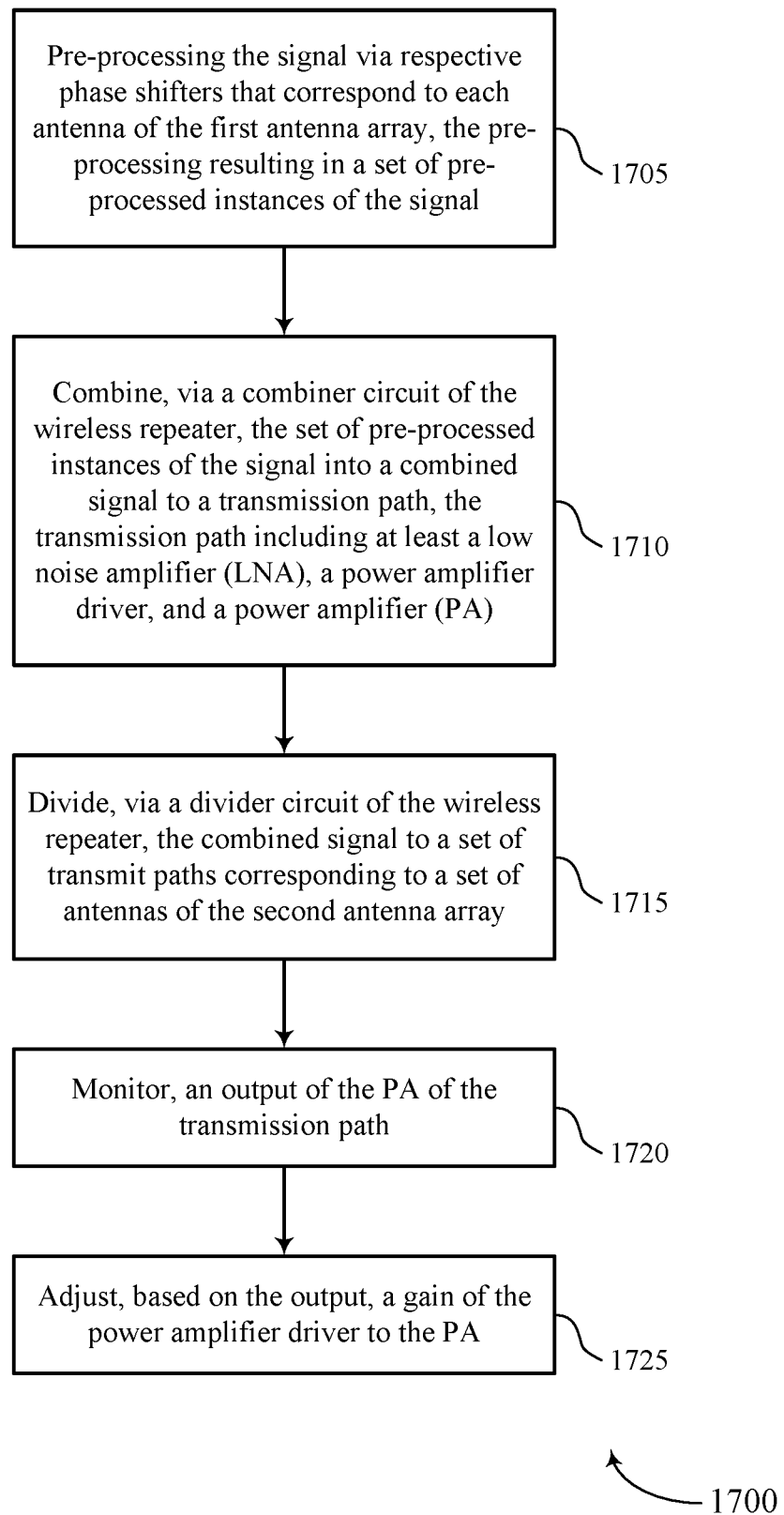

FIG. 17 shows a signal processing flow illustrating a method 1700 that supports a configurable beamforming repeater in accordance with aspects of the present disclosure. The operations of method 1700 may be implemented by a repeater 205 or its components as described herein. For example, the operations of method 1700 may be performed by a signal processing chain as described with reference to FIGS. 11 through 13.

At 1705, the repeater may pre-process the signal via respective phase shifters that correspond to each antenna of the first antenna array, the pre-processing resulting in a set of pre-processed instances of the signal. The operations of 1705 may be performed according to the methods described herein. In some examples, aspects of the operations of 1705 may be performed by a signal processing chain as described with reference to FIGS. 11 through 13.

At 1710, the repeater may combine, via a combiner circuit of the wireless repeater, the set of pre-processed instances of the signal into a combined signal to a transmission path, the transmission path including at least a low noise amplifier (LNA), a power amplifier driver, and a power amplifier (PA). The operations of 1710 may be performed according to the methods described herein. In some examples, aspects of the operations of 1710 may be performed by a signal processing chain as described with reference to FIGS. 11 through 13.

At 1715, the repeater may divide, via a divider circuit of the wireless repeater, the combined signal to a set of transmit paths corresponding to a set of antennas of the second antenna array. The operations of 1715 may be performed according to the methods described herein. In some examples, aspects of the operations of 1715 may be performed by a signal processing chain as described with reference to FIGS. 11 through 13.

At 1720, the repeater may monitor, an output of the PA of the transmission path. The operations of 1720 may be performed according to the methods described herein. In some examples, aspects of the operations of 1720 may be performed by a signal processing chain as described with reference to FIGS. 11 through 13.

At 1725, the repeater may adjust, based on the output, a gain of the power amplifier driver to the PA. The operations of 1725 may be performed according to the methods described herein. In some examples, aspects of the operations of 1725 may be performed by a signal processing chain as described with reference to FIGS. 11 through 13.

Figure 18:
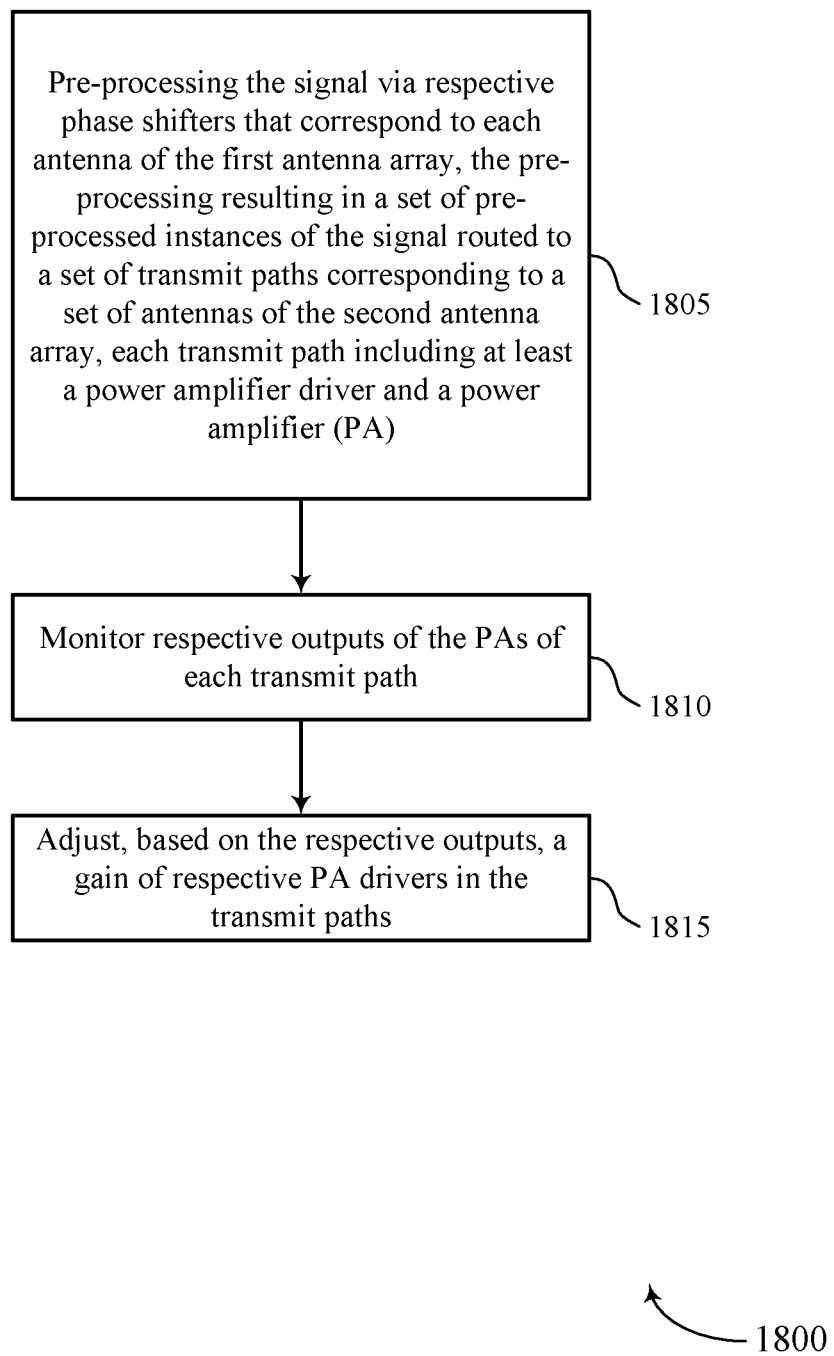

FIG. 18 shows a signal processing flow illustrating a method 1800 that supports a configurable beamforming repeater in accordance with aspects of the present disclosure. The operations of method 1800 may be implemented by a repeater 140 or its components as described herein. For example, the operations of method 1800 may be performed by a signal processing chain as described with reference to FIGS. 11 through 13.

At 1805, the repeater may pre-process the signal via respective phase shifters that correspond to each antenna of the first antenna array, the pre-processing resulting in a set of pre-processed instances of the signal routed to a set of transmit paths corresponding to a set of antennas of the second antenna array, each transmit path including at least a power amplifier driver and a power amplifier (PA). The operations of 1805 may be performed according to the methods described herein. In some examples, aspects of the operations of 1805 may be performed by a signal processing chain as described with reference to FIGS. 11 through 13.

At 1810, the repeater may monitor respective outputs of the PAs of each transmit path. The operations of 1810 may be performed according to the methods described herein. In some examples, aspects of the operations of 1810 may be performed by a signal processing chain as described with reference to FIGS. 11 through 13.

At 1815, the repeater may adjust, based on the respective outputs, a gain of respective PA drivers in the transmit paths. The operations of 1815 may be performed according to the methods described herein. In some examples, aspects of the operations of 1815 may be performed by a signal processing chain as described with reference to FIGS. 11 through 13.

Figure 19:
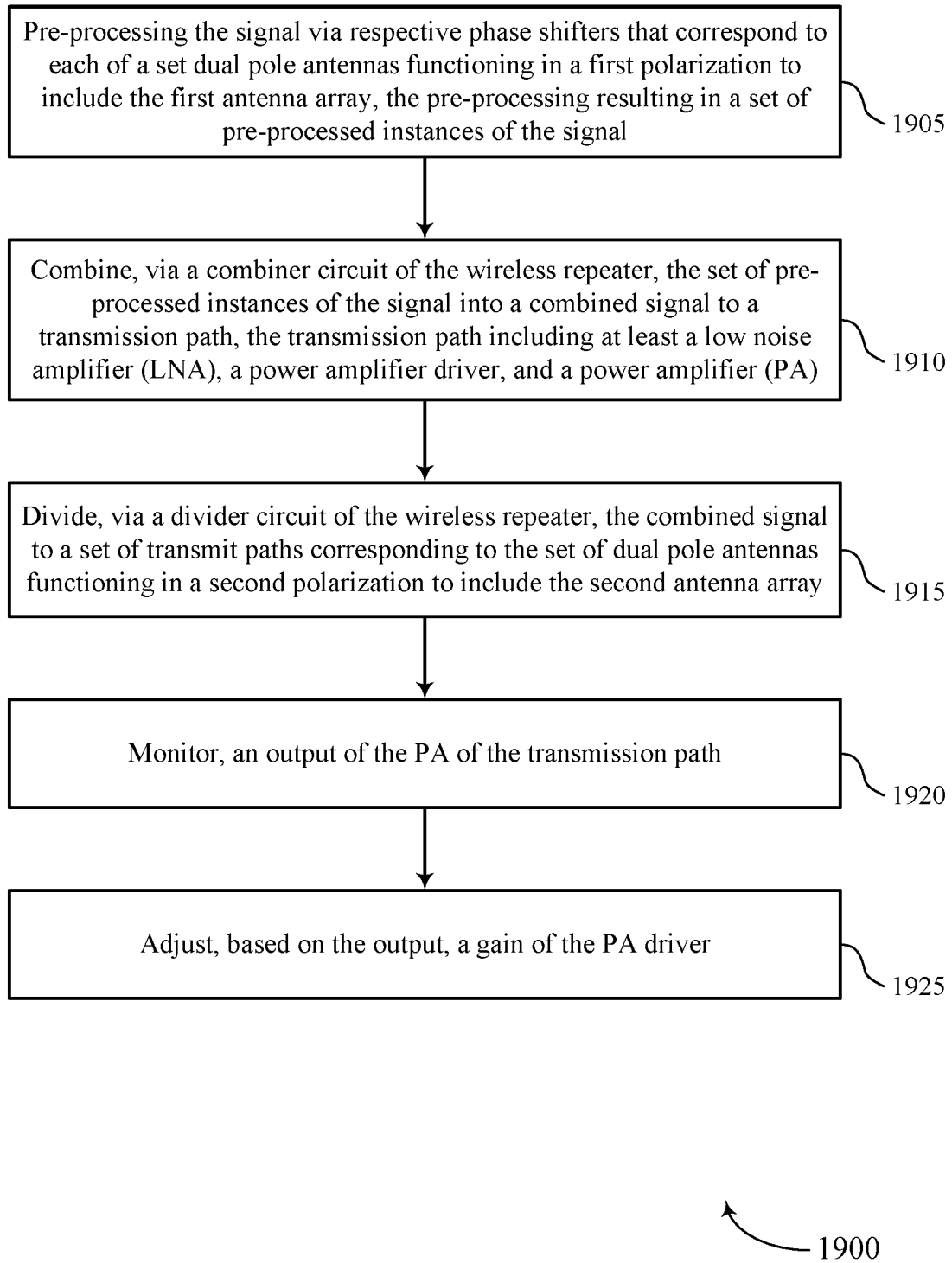

FIG. 19 shows a signal processing flow illustrating a method 1900 that supports a configurable beamforming repeater in accordance with aspects of the present disclosure. The operations of method 1900 may be implemented by a repeater 140 or its components as described herein. For example, the operations of method 1900 may be performed by a signal processing chain as described with reference to FIGS. 11 through 13.

At 1905, the repeater may pre-process the signal via respective phase shifters that correspond to each of a set of dual pole antennas functioning in a first polarization to include the first antenna array, the pre-processing resulting in a set of pre-processed instances of the signal. The operations of 1905 may be performed according to the methods described herein. In some examples, aspects of the operations of 1905 may be performed by a signal processing chain as described with reference to FIGS. 11 through 13.

At 1910, the repeater may combine, via a combiner circuit of the wireless repeater, the set of pre-processed instances of the signal into a combined signal to a transmission path, the transmission path including at least a low noise amplifier (LNA), a power amplifier driver, and a power amplifier (PA). The operations of 1910 may be performed according to the methods described herein. In some examples, aspects of the operations of 1910 may be performed by a signal processing chain as described with reference to FIGS. 11 through 13.

At 1915, the repeater may divide, via a divider circuit of the wireless repeater, the combined signal to a set of transmit paths corresponding to the set of dual pole antennas functioning in a second polarization to include the second antenna array. The operations of 1915 may be performed according to the methods described herein. In some examples, aspects of the operations of 1915 may be performed by a signal processing chain as described with reference to FIGS. 11 through 13.

At 1920, the repeater may monitor, an output of the PA of the transmission path. The operations of 1920 may be performed according to the methods described herein. In some examples, aspects of the operations of 1920 may be performed by a signal processing chain as described with reference to FIGS. 11 through 13.

At 1925, the repeater may adjust, based on the output, a gain of the PA driver. The operations of 1925 may be performed according to the methods described herein. In some examples, aspects of the operations of 1925 may be performed by a signal processing chain as described with reference to FIGS. 11 through 13.

Figure 20:
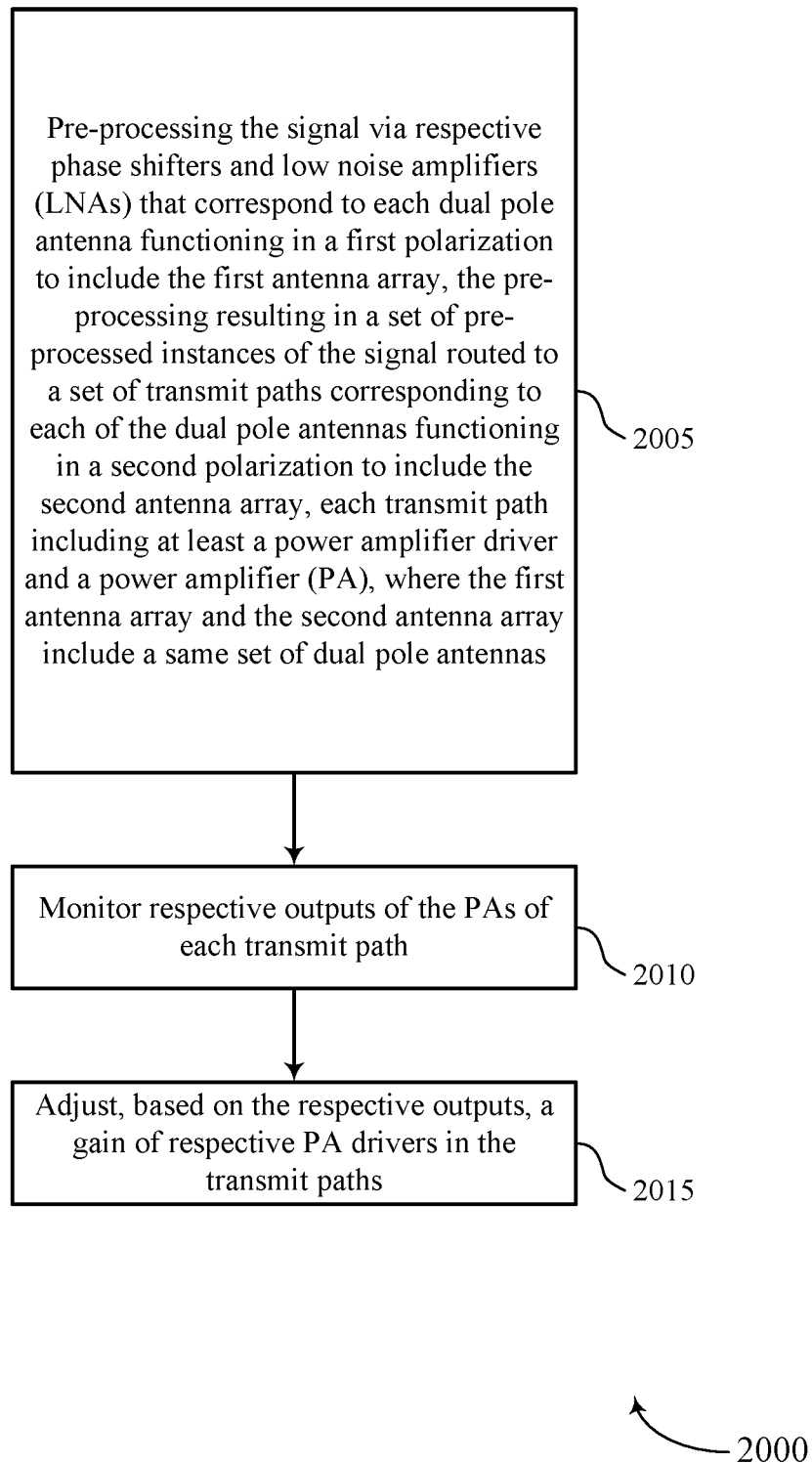

FIG. 20 shows a signal processing flow illustrating a method 2000 that supports a configurable beamforming repeater in accordance with aspects of the present disclosure. The operations of method 2000 may be implemented by a repeater 140 or its components as described herein. For example, the operations of method 2000 may be performed by a signal processing chain as described with reference to FIGS. 11 through 14.

At 2005, the repeater may pre-process the signal via respective phase shifters and low noise amplifiers (LNAs) that correspond to each dual pole antenna functioning in a first polarization to include the first antenna array, the pre-processing resulting in a set of pre-processed instances of the signal routed to a set of transmit paths corresponding to each of the dual pole antennas functioning in a second polarization to include the second antenna array, each transmit path including at least a power amplifier driver and a power amplifier (PA), where the first antenna array and the second antenna array include a same set of dual pole antennas. The operations of 2005 may be performed according to the methods described herein. In some examples, aspects of the operations of 2005 may be performed by a signal processing chain as described with reference to FIGS. 11 through 13.

At 2010, the repeater may monitor respective outputs of the PAs of each transmit path. The operations of 2010 may be performed according to the methods described herein. In some examples, aspects of the operations of 2010 may be performed by a signal processing chain as described with reference to FIGS. 11 through 13.

At 2015, the repeater may adjust, based on the respective outputs, a gain of respective PA drivers in the transmit paths. The operations of 2015 may be performed according to the methods described herein. In some examples, aspects of the operations of 2015 may be performed by a signal processing chain as described with reference to FIGS. 11 through 13.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communication, comprising:
a dual pole antenna array comprising:
a first antenna array configured to receive a signal via directional beamforming; and
a second antenna array configured to retransmit the signal via directional beamforming transmit beams;
a radio frequency signal processing chain to route the signal between reception at the first antenna array and retransmission at the second antenna array, each component of the radio frequency signal processing chain comprising a respective analog component configured to process the signal in an analog domain, wherein the radio frequency signal processing chain comprises:
a plurality of receive paths, wherein each receive path is connected to a respective dual pole antenna of the dual pole antenna array configured to function in a first polarization as the first antenna array, and wherein each receive path includes a respective phase shifter;
a transmission path including at least one low noise amplifier (LNA), at least one power amplifier (PA), and a PA driver, wherein the signals received through the plurality of receive paths are combined and routed through the transmission path to a plurality of transmit paths; and
the plurality of transmit paths, wherein each transmit path corresponds to a respective dual pole antenna of the dual pole antenna array configured to function in a second polarization as the second antenna array; and
a radio frequency feedback path connected to the radio frequency signal processing chain for adjusting a gain of the PA driver for the at least one PA based on an output of the at least one PA, wherein the radio frequency feedback path comprises one or more analog components configured to operate in the analog domain.

2. The apparatus of claim 1, wherein the radio frequency feedback path further comprises:
a coupler for connecting the radio frequency feedback path to the radio frequency signal processing chain;
a power detector for monitoring the output of the at least one PA; and
a gain controller for adjusting the gain of the PA driver to the at least one PA.

3. The apparatus of claim 1, further comprising:
an LNA for each antenna of the first antenna array, the radio frequency feedback path further for adjusting a gain of the LNA based on the output of the at least one PA.

4. The apparatus of claim 1, wherein each of the plurality of receive paths includes a respective LNA and a phase shifter, and
wherein the radio frequency signal processing chain further comprises:
a combiner circuit configured to combine the signals received through the plurality of receive paths; and
a divider circuit configured to divide an output of the combiner circuit into the plurality of transmit paths, wherein each of the plurality of transmit paths includes a respective PA driver and a PA.

5. The apparatus of claim 1, wherein the radio frequency feedback path comprises a plurality of radio frequency feedback paths corresponding to each of the plurality of transmit paths.

6. The apparatus of claim 5, further comprising:
a gain controller coupled to each of the plurality of radio frequency feedback paths for adjusting the gains of respective PA drivers.

7. The apparatus of claim 1, wherein the radio frequency signal processing chain further comprises:
a combiner circuit configured to combine the signals received through the plurality of receive paths and route the combined signals to the transmission path; and
a divider circuit configured to divide an output of the transmission path into the plurality of transmit paths.

8. The apparatus of claim 1, further comprising:
a gain controller coupled to the radio frequency feedback path for adjusting the gain of the PA driver.

9. The apparatus of claim 1, wherein the plurality of transmit paths are each connected to a respective antenna of the first antenna array and a respective antenna of the second antenna array, wherein each of the plurality of transmit paths includes a respective LNA, a phase shifter, a PA driver, and a PA.

10. The apparatus of claim 1, further comprising:
a plurality of radio frequency feedback paths corresponding to each of the plurality of transmit paths.

11. The apparatus of claim 10, further comprising:
a gain controller coupled to each of the plurality of radio frequency feedback paths for adjusting the gains of respective PA drivers.

12. The apparatus of claim 1, wherein the radio frequency signal processing chain further comprises:
a combiner circuit configured to combine the signals received through the plurality of receive paths and route the combined signals to the transmission path; and
a divider circuit configured to divide an output of the transmission path into the plurality of transmit paths.

13. The apparatus of claim 1, further comprising:
a gain controller coupled to the radio frequency feedback path for adjusting the gain of the PA driver.

14. The apparatus of claim 1, wherein each of the plurality of transmit paths includes a respective LNA, a phase shifter, a PA driver, and a PA.

15. The apparatus of claim 1, further comprising:
a plurality of radio frequency feedback paths corresponding to each of the plurality of transmit paths.

16. The apparatus of claim 15, further comprising:
a gain controller coupled to each of the plurality of radio frequency feedback paths for adjusting gains of respective PA drivers.

17. The apparatus of claim 1, further comprising:
a reception beam control circuit for adjusting a phase shifter for each antenna of the first antenna array; and
a transmission beam control circuit for adjusting a phase shifter for each antenna of the second antenna array.

18. The apparatus of claim 1, wherein the first antenna array, the second antenna array, or both comprise a metamaterial antenna having a negative refractive index.

19. A method for wireless communication, comprising:
receiving, at a dual pole antenna array functioning in a first polarization as a first antenna array of a wireless repeater, a signal via directional beamforming;
retransmitting the signal via directional beamforming at the dual pole antenna array functioning in a second polarization as a second antenna array of the wireless repeater;
monitoring an output of at least one power amplifier (PA) of a radio frequency signal processing chain connected to route the signal between reception at the first antenna array and retransmission at the second antenna array, wherein the signal is routed in an analog domain between the first antenna array and the second antenna array, and wherein routing the signal between reception at the first antenna array and retransmission at the second antenna array comprises:
pre-processing the signal at each of a plurality of receive paths of the radio frequency signal processing chain, wherein each receive path is connected to a respective dual pole antenna array of the dual pole antenna array functioning in the first polarization as the first antenna array, and wherein each receive path includes a respective phase shifter;
combining a plurality of pre-processed instances of the signal into a combined signal; and
routing, via a transmission path of the radio frequency signal processing chain, the combined signal to a plurality of transmit paths of the radio frequency signal processing chain, wherein the transmission path includes a low noise amplifier (LNA), the at least one PA, and a PA driver, and wherein each transmit path corresponds to a respective dual pole antenna of the dual pole antenna array functioning in the second polarization as the second antenna array; and
adjusting, based at least in part on the output, a gain of the PA driver to the at least one PA, wherein the gain is adjusted in the analog domain.

20. The method of claim 19, further comprising:
adjusting, based at least in part on the output, a gain of at least one LNA connected to the first antenna array.

21. The method of claim 19, wherein monitoring the output of the at least one PA of the radio frequency signal processing chain comprises:
monitoring the output of the at least one PA via a radio frequency feedback path connected to the radio frequency signal processing chain between the first antenna array and the second antenna array.

22. The method of claim 21, wherein the radio frequency feedback path comprises a coupler for connecting to the radio frequency signal processing chain, a power detector for monitoring the output of the at least one PA, and a gain controller for adjusting the gain of the PA driver to the at least one PA.

23. The method of claim 19, wherein the pre-processing comprises pre-processing the signal via respective low noise amplifiers (LNAs) and phase shifters that each correspond to a respective dual pole antenna of the dual pole antenna array functioning in the first polarization as the first antenna array,
wherein the combining comprises combining, via a combiner circuit of the wireless repeater, the plurality of pre-processed instances of the signal into the combined signal, and wherein the method further comprises:
dividing, via a divider circuit of the wireless repeater, the combined signal into the plurality of transmit paths, each transmit path including at least a respective PA driver and a respective PA;
monitoring respective outputs of the respective PAs of each transmit path; and
adjusting, based at least in part on the respective outputs, a gain of respective PA drivers in the plurality of transmit paths.

24. The method of claim 19, wherein the pre-processing comprises pre-processing the signal via respective phase shifters that each correspond to a respective dual pole antenna of the dual pole antenna array functioning in the first polarization as the first antenna array,
and wherein the combining comprises combining, via a combiner circuit of the wireless repeater, the plurality of pre-processed instances of the signal into a combined signal to be routed to the transmission path, and
wherein the method further comprises dividing, via a divider circuit of the wireless repeater, the combined signal into the plurality of transmit paths.

25. The method of claim 19, wherein the pre-processing comprises pre-processing the signal via respective phase shifters that each correspond to a respective dual pole antenna of the dual pole antenna array functioning in the first polarization as the first antenna array, and wherein each transmit path includes at least a respective PA driver and a respective PA, and wherein the method further comprises:
monitoring respective outputs of the respective PAs of each transmit path; and
adjusting, based at least in part on the respective outputs, a gain of the respective PA drivers in the plurality of transmit paths.

26. An apparatus for wireless communication, comprising:
means for receiving, at a dual pole antenna array functioning in a first polarization as a first antenna array of a wireless repeater, a signal via directional beamforming;
means for retransmitting the signal via directional beamforming at the dual pole antenna array functioning in a second polarization as a second antenna array of the wireless repeater;
means for monitoring an output of at least one power amplifier (PA) of a radio frequency signal processing chain connected to route the signal between reception at the first antenna array and retransmission at the second antenna array, wherein the signal is routed in an analog domain between the first antenna array and the second antenna array, and wherein routing the signal between reception at the first antenna array and retransmission at the second antenna array comprises:
means for pre-processing the signal at each of a plurality of receive paths of the radio frequency signal processing chain, wherein each receive path is connected to a respective dual pole antenna array of the dual pole antenna array functioning in the first polarization as the first antenna array, and wherein each receive path includes a respective phase shifter;
means for combining a plurality of pre-processed instances of the signal into a combined signal;
means for routing, via a transmission path of the radio frequency signal processing chain, the signal received through the plurality of receive paths to a plurality of transmit paths of the radio frequency signal processing chain, wherein the transmission path includes a low noise amplifier (LNA), the at least one PA, and a PA driver, and wherein each transmit path corresponds to a respective dual pole antenna of the dual pole antenna array functioning in the second polarization as the second antenna array; and
means for adjusting, based at least in part on the output, a gain of the PA driver to the at least one PA, wherein the gain is adjusted in the analog domain.

27. The apparatus of claim 26, further comprising:
means for connecting, via a coupler, a radio frequency feedback path to the radio frequency signal processing chain,
means for monitoring, via a power detector, the output of the at least one PA, and
means for adjusting, via a gain controller, the gain of the PA driver to the at least one PA.

28. The apparatus of claim 26, wherein the means for pre-processing comprises means for pre-processing the signal via respective low noise amplifiers (LNAs) and phase shifters that each correspond to a respective dual pole antenna of the dual pole antenna array functioning in the first polarization as the first antenna array,
wherein the means for combining comprises means for combining, via a combiner circuit of the wireless repeater, the plurality of pre-processed instances of the signal into the combined signal, and
wherein the apparatus further comprises:
means for dividing, via a divider circuit of the wireless repeater, the combined signal into the plurality of transmit paths, each transmit path including at least a respective PA driver and a respective PA;
means for monitoring respective outputs of the respective PAs of each transmit path; and
means for adjusting, based at least in part on the respective outputs, a gain of respective PA drivers in the plurality of transmit paths.

\* \* \* \* \*